United States Patent
Chen et al.

(10) Patent No.: US 12,463,773 B2
(45) Date of Patent: Nov. 4, 2025

(54) ENHANCED CYCLIC SHIFT CONFIGURATION FOR MULTI-PORT SOUNDING REFERENCE SIGNALS

(71) Applicant: QUALCOMM Incorporated, San Diego, CA (US)

(72) Inventors: Yitao Chen, San Diego, CA (US); Mostafa Khoshnevisan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 484 days.

(21) Appl. No.: 17/819,265

(22) Filed: Aug. 11, 2022

(65) Prior Publication Data

US 2024/0056252 A1    Feb. 15, 2024

(51) Int. Cl.
*H04L 5/00*    (2006.01)

(52) U.S. Cl.
CPC .................................. *H04L 5/0051* (2013.01)

(58) Field of Classification Search
CPC ..................................................... H04L 5/0051
USPC ......................................................... 370/329
See application file for complete search history.

(56) References Cited

U.S. PATENT DOCUMENTS

| | | | |
|---|---|---|---|
| 2019/0158171 A1* | 5/2019 | Ren | H04B 7/0663 |
| 2019/0274155 A1* | 9/2019 | Bhattad | H04L 5/0073 |
| 2020/0146048 A1* | 5/2020 | Lee | H04W 72/535 |
| 2020/0313815 A1* | 10/2020 | Sridharan | H04L 5/0048 |
| 2020/0366429 A1* | 11/2020 | Huang | H04W 72/542 |
| 2022/0173865 A1* | 6/2022 | Maamari | H04W 72/23 |
| 2023/0188398 A1* | 6/2023 | Alawieh | H04L 27/2613 |
| | | | 375/262 |
| 2024/0163043 A1* | 5/2024 | Chen | H04L 5/00 |
| 2024/0178969 A1* | 5/2024 | Gao | H04L 5/0051 |

* cited by examiner

*Primary Examiner* — Xuan Lu
(74) *Attorney, Agent, or Firm* — Kevin M. Donnelly; ArentFox Schiff LLP

(57) ABSTRACT

This disclosure provides systems, devices, apparatus and methods, including computer programs encoded on storage media, for a user equipment (UE) to receive a configuration for a plurality of groups of sounding reference signal (SRS) ports associated with an SRS resource, the configuration indicating one or more cyclic shift parameters for each group of SRS ports of the plurality of groups of SRS ports. The UE also can transmit one or more SRSs using at least one group of SRS ports of the plurality of groups of SRS ports based at least in part on the one or more cyclic shift parameters associated with the at least one group of SRS ports.

26 Claims, 12 Drawing Sheets

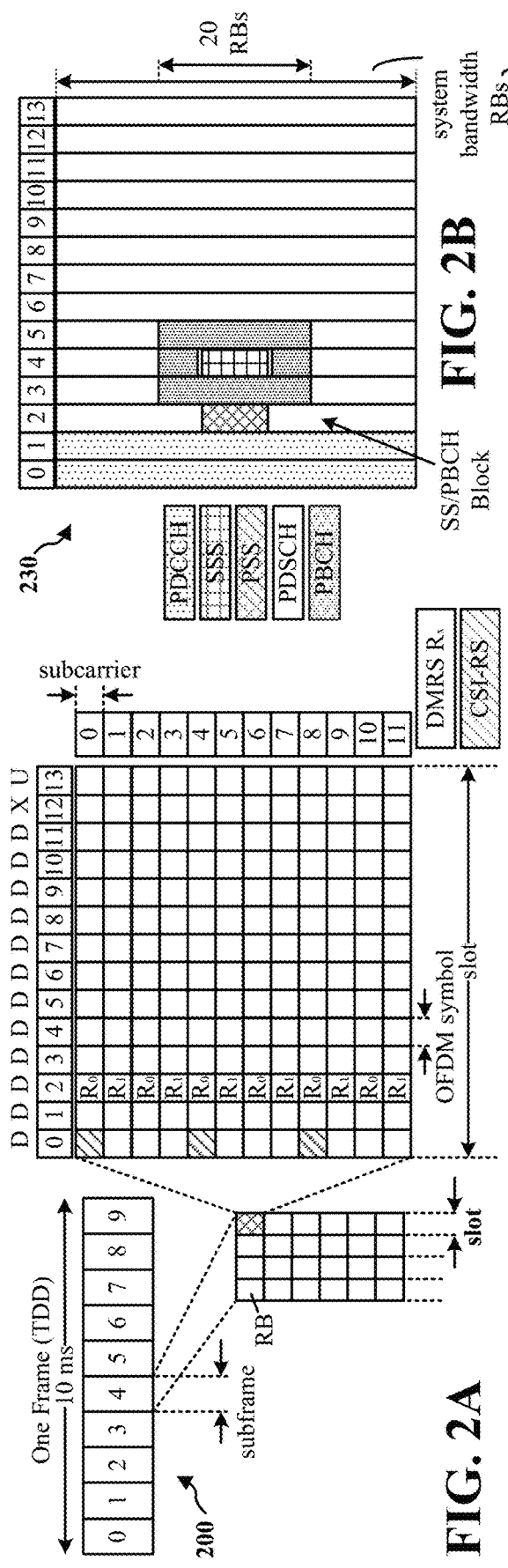
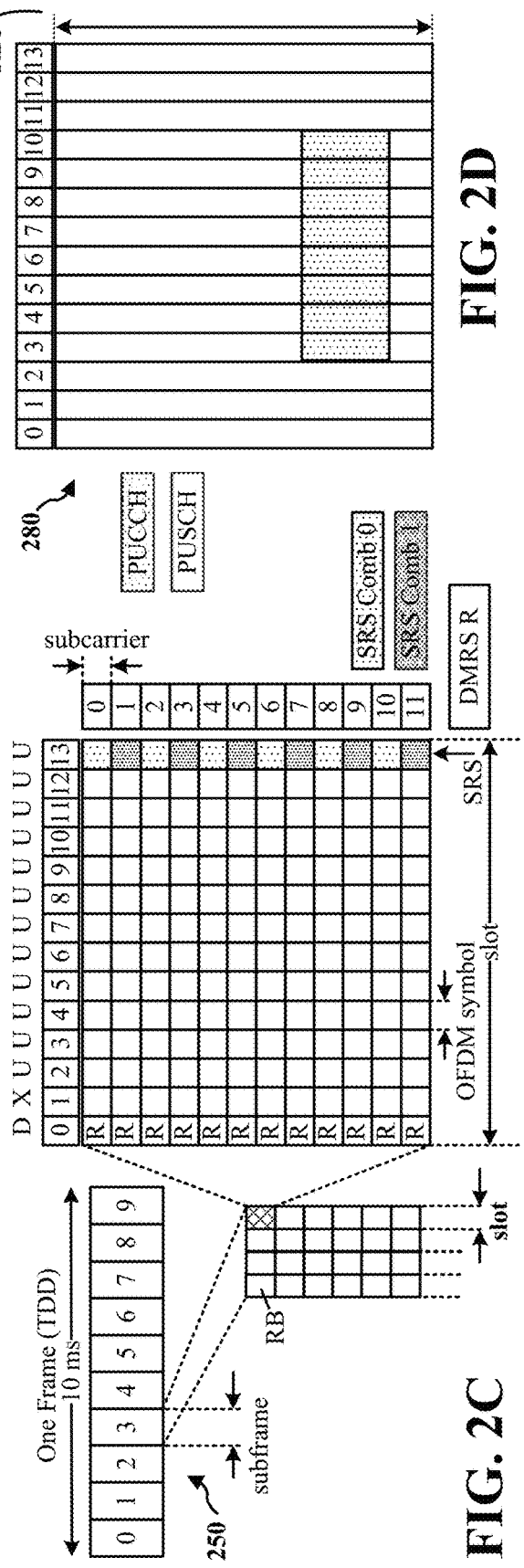
FIG. 2A
FIG. 2B
FIG. 2C
FIG. 2D

ENHANCED CYCLIC SHIFT CONFIGURATION FOR MULTI-PORT SOUNDING REFERENCE SIGNALS

BACKGROUND

Technical Field

The present disclosure relates generally to communication systems, and more specifically, to enhanced cyclic shift configuration for multi-port sounding reference signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

Some wireless communication systems using multiple-access technologies may simultaneously support communication for multiple wireless devices. Each mobile device may communicate with one or more base stations via transmissions on downlink and uplink channels. A base station may schedule a wireless device to transmit an uplink signal to a target transmission and reception point (TRP). However, in some examples, the uplink signal may interfere with an uplink signal from a different wireless device, which may result in delays, inefficient communications, and relatively high signaling overhead.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a receiving device such as a user equipment (UE). The method may include receiving a configuration for a plurality of groups of sounding reference signal (SRS) ports associated with an SRS resource, the configuration indicating one or more cyclic shift parameters for each group of SRS ports of the plurality of groups of SRS ports. The method may include transmitting one or more SRSs using at least one group of SRS ports of the plurality of groups of SRS ports based at least in part on the one or more cyclic shift parameters associated with the at least one group of SRS ports.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

One innovative aspect of the subject matter described in this disclosure can be implemented in a method of wireless communication at an apparatus of a transmitting device such as a base station (BS). The method may include transmitting a configuration for a plurality of groups of SRS ports associated with an SRS resource, the configuration indicating one or more cyclic shift parameters for each group of SRS ports of the plurality of groups of SRS ports. The method may include receiving one or more SRSs of at least one group of SRS ports of the plurality of groups of SRS ports based at least in part on the one or more cyclic shift parameters associated with the at least one group of SRS ports.

The present disclosure also provides an apparatus (e.g., a BS) including a memory storing computer-executable instructions and at least one processor configured to execute the computer-executable instructions to perform the above method, an apparatus including means for performing the above method, and a non-transitory computer-readable medium storing computer-executable instructions for performing the above method.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 2A, 2B, 2C, and 2D are diagrams illustrating examples of a first 5G/New Radio (NR) frame, downlink (DL) channels within a 5G/NR subframe, a second 5G/NR frame, and uplink (UL) channels within a 5G/NR subframe, respectively.

Like reference numbers and designations in the various drawings indicate like elements.

DETAILED DESCRIPTION

Figure 1:
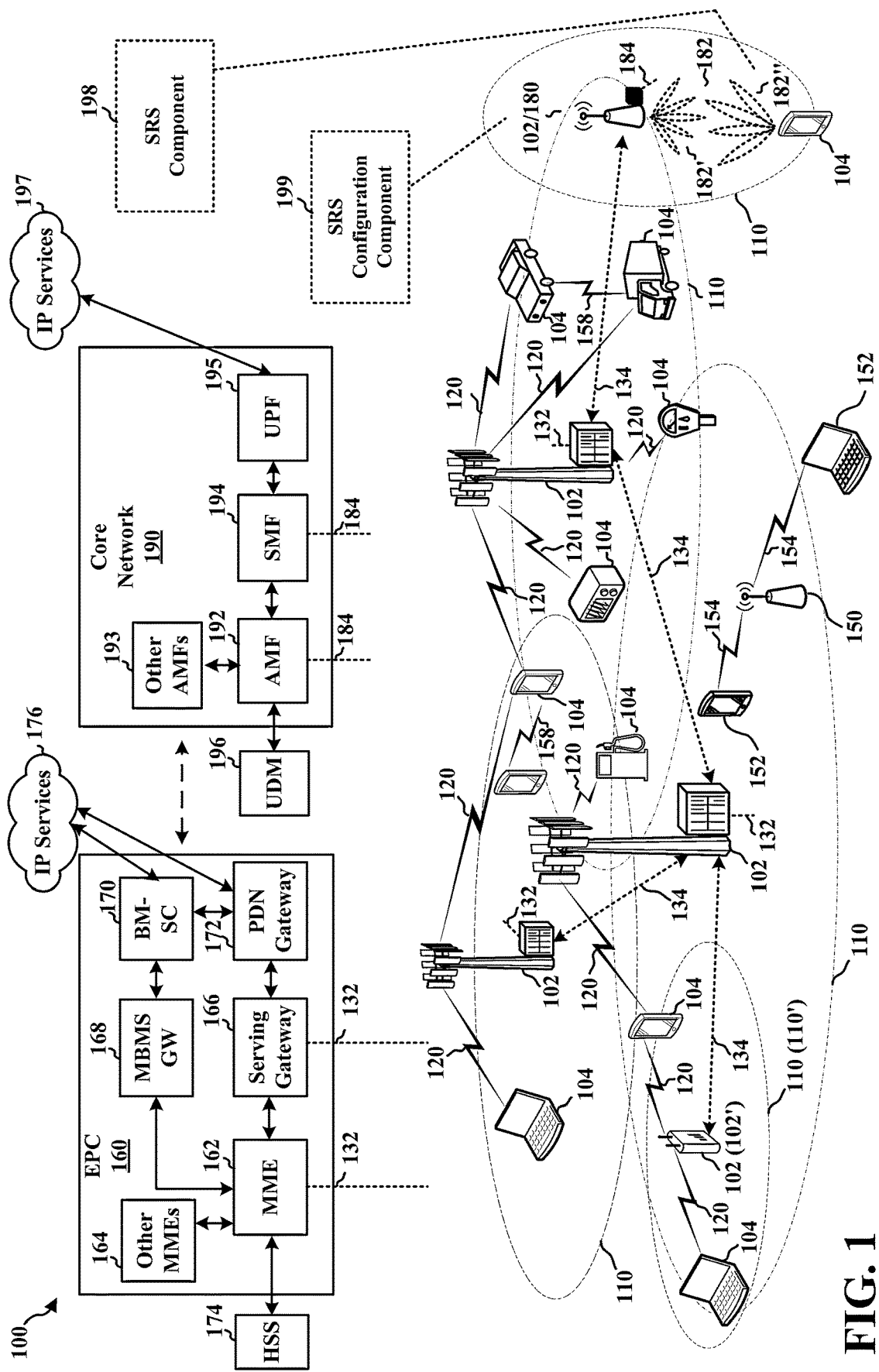
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, legacy structures and components are shown in block diagram form in order to avoid obscuring such concepts.

In some examples, a multiple transmit-receive point (TRP) cooperative transmission scheme may involve coherent joint transmission (CJT). In CJT, data transmitted to a same UE by multiple TRPs are jointly beamformed, and the precoding matrix applied to the different TRPs is coordinated so that the data in a given same layer can be coherently combined at the UE. For purposes of CJT, the UE can transmit uplink reference signaling, such as sounding reference signals (SRS), to assist a network in estimating uplink channel quality. The SRS generally provides information about the combined effects of multipath fading, scattering, Doppler effects, and power loss, which can be used for closed-loop spatial multiplexing, uplink transmitting timing control, and reciprocity-based multi-user downlink precoding. A resource set may include multiple SRS resources, where each SRS resource may include an SRS port associated with an antenna port of a UE. In some examples, the SRS resource may include multiple SRS ports associated with respective antenna ports of the UE (also referred to as "multi-port SRS").

An SRS may cover a full bandwidth, where corresponding resource elements are spread across different symbols so as to cover all subcarriers. In some such examples, SRS transmissions may be time and frequency multiplexed, such that these SRS transmissions may be mapped to nonconsecutive subcarriers in one or more symbols of a subframe, thereby creating a "comb-like" pattern (referred to as a "comb pattern"). For example, a comb pattern may be defined by the division of subcarriers between channels when the channels are frequency division multiplexed. In some examples, UEs can be multiplexed over the same transmitting symbol by configuring different comb patterns with different comb spacings and/or comb offsets between the comb patterns. For example, a comb spacing may be defined as the distance between two subcarriers of a comb pattern associated with respective SRS transmissions. A comb offset may be defined by the difference between a first subcarrier of a comb pattern and a reference subcarrier (e.g., the first subcarrier of a resource block). For multi-user transmissions, SRS transmissions may be orthogonalized using various cyclic shifts, comb patterns and comb offsets.

Because CJT involves beamforming where the beamforming antennas are not co-located but, instead, correspond to different TRPs, there may be SRS interference across different UEs, which may degrade the beamforming performance across the different TRPs, thereby resulting in channel estimation errors by the network. In some legacy approaches to addressing SRS interference, a network entity may configure a UE with a common comb offset parameter or a common cyclic shift parameter, such that the cyclic shifts or comb offsets associated with SRS transmissions of the UE are common across the SRS ports in the SRS resource. For example, the network entity may configure a single comb offset and a single cyclic shift for use by all SRS ports in the SRS resource. However, because the SRS configuration configures a UE with cyclic shifts that are common across the SRS ports for the SRS resource, there is no flexibility at the UE to send SRS transmissions with a comb offset or a cyclic shift that is different across different SRS ports of the SRS resource. The lack of flexibility in assigning cyclic shifts and comb spacing to SRS ports may cause some SRS transmissions to be degraded and retransmitted due to the SRS interference. This may result in the consumption of additional processing resources and signaling resources.

In some other legacy approaches to addressing the SRS interference, the network entity may instead configure a UE with cycle shift parameters and comb offset parameters on a per SRS port basis for a given SRS resource. That is, a cyclic shift parameter may be specific to each individual SRS port. For example, the UE may be provided with an explicit configuration and/or indication of a respective cyclic shift parameter for each SRS port of an SRS resource. In some such examples, the configuration also may include a cyclic shift parameter that indicates a same cyclic shift spacing between two or more consecutive SRS ports for an SRS resource. The cyclic shift spacing may be defined as the distance between two cyclic shift values associated with two respective consecutive SRS ports in a same group of SRS ports. However, the legacy cyclic shift configuration on a per-SRS-port basis for multi-port SRS does not take into account whether SRS ports have the same comb offset or have different comb offsets. Additionally, the legacy cyclic shift configuration on a per-SRS-port basis may not take into account port grouping across SRS ports on a given SRS resource, which may be used for determining the comb offset for a given SRS port.

Various aspects relate generally to enhanced cyclic shift configuration for multi-port SRS transmission. In some examples, a network entity transmits, to a UE, a configuration for multiple groups of SRS ports of the UE associated with an SRS resource. For an SRS resource associated with multiple UE antenna ports (e.g., 2, 4, 8), where SRS ports are divided into two or more groups of SRS ports, a configuration and/or indication per group of SRS ports may facilitate the UE in determining a cyclic shift value for each SRS port in a respective group. For example, the configuration may indicate one or more respective cyclic shift parameters for each group of SRS ports. The UE may then select a group of SRS ports and transmit SRSs using the group of SRS ports based on the cyclic shift parameters configured for the group of SRS ports. For example, the UE can determine an antenna port cyclic shift value for each SRS port of the group of SRS ports based on the cyclic shift parameters associated with the group of SRS ports.

Particular implementations of the subject matter described in this disclosure can be implemented to realize one or more of the following potential advantages. By allowing a network to configure a UE with a per-group-of-SRS-ports configuration, the amount of control signaling overhead between the network and UE can be reduced as compared with the approaches involving per-SRS-resource and per-SRS-port configurations. The UE has the flexibility to be configured with various cyclic shifts for different SRS ports of a given group in a SRS resource while also having the flexibility to be configured with different comb offsets between groups of SRS ports. By configuring cyclic shift parameters and/or comb offset parameters on a per-group basis, the UE may also more successfully avoid or mitigate SRS interference. By improving SRS transmissions and by better avoiding SRS interference, the network entity and the UE may conserve processing resources and signaling resources.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base station 102 is a network entity that communicates with the UEs 104. The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102.

In some aspects, the term "base station" (e.g., the base station 102) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 102. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The access network 100 may include one or more relay stations. A relay station is a network entity that can receive a transmission of data from an upstream station (e.g., a network entity or a UE 104) and send a transmission of the data to a downstream station (e.g., a UE 104 or a network entity). A relay station may be a UE 104 that can relay transmissions for other UEs 104. In the example shown in FIG. 1, the BS 102 (e.g., a relay base station) may communicate with the BS 102 (e.g., a macro base station) and the UE 104 in order to facilitate communication between the BS 102 and the UE 104. A base station 102 that relays communications may be referred to as a relay station, a relay base station, a relay, or the like.

A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some examples, two or more UEs 104 may communicate directly using one or more sidelink channels (e.g., without using a network entity as an intermediary to communicate with one another). For example, the UEs 104 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 104 may perform scheduling operations, resource selection operations, and/or other operations described elsewhere herein as being performed by the base station 102.

Devices of the access network 100 may communicate using the electromagnetic spectrum, which may be subdivided by frequency or wavelength into various classes, bands, channels, or the like. For example, devices of the access network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

CJT may involve beam-forming where the beam-forming antennas are not co-located but correspond to different TRPs. There may be SRS interference across the different UEs for CJT across the multiple TRPs, and any enhancements to address the SRS interference are expected to reuse existing SRS comb patterns. For a large number of UEs, multiple UEs may need to send an SRS on the same OFDM symbols.

To account for SRS interference, a network entity may carefully assign comb offsets and cyclic shifts. However, it is not currently possible to configure a comb offset and a cyclic shift per SRS port in a given SRS resource. Rather, one comb offset and one comb cyclic shift are configured for an entire SRS resource. Cyclic shifts are evenly distributed among the SRS ports for the SRS resource. There is currently no flexibility to configure a comb offset or a cyclic shift for different SRS ports of an SRS resource.

In other words, different SRS ports are transmitted on the same REs (same comb offset) with exceptions (for 4 ports) that are not very flexible. For example, for a comb spacing of 4 with 12 cyclic shifts involving a first UE with 2 SRS ports and a second UE with 2 SRS ports, the first UE may be assigned cyclic shifts {0, 6} and the second UE may be assigned cyclic shifts {2, 8}. However, it is not possible to assign cyclic shifts {0, 2} to the first UE and cyclic shifts {6, 8} to the second UE. The lack of flexibility in assigning cyclic shifts and comb spacing to SRS ports may cause some SRS transmissions to be degraded and retransmitted due to SRS interference. This may consume additional processing resources and signaling resources.

In some legacy approaches, a network entity may configure a UE with cycle shift parameters per SRS port for a given SRS resource. That is, cyclic shift parameters may be specific to each individual SRS port, whether the parameters are configured for one SRS port, for each of some of the SRS ports of the UE, or for each of all of the SRS ports of the UE. For example, the UE may be provided with explicit configuration and/or indication of cyclic shift parameters for each SRS port of an SRS resource. In some aspects, the configuration also may include cyclic shift spacing across consecutive SRS ports for an SRS resource. By configuring cyclic shift parameters on a per-SRS-port basis (rather than per SRS resource), SRS enhancement to manage inter-TRP cross-SRS interference targeting TDD CJT via SRS interference randomization and/or capacity enhancement.

However, the legacy cyclic shift configuration on a per-SRS-port basis for multi-port SRS does not take into account whether SRS ports have the same comb offset or have different comb offsets. In cases involving 4 SRS ports, two SRS ports may have one comb offset and the other two SRS ports may have another comb offset. Additionally, the legacy cyclic shift configuration on a per-SRS-port basis may not take into account the port grouping across SRS ports on a given SRS resource, which may be used for deciding the comb offset for a given SRS port. In some cases, the port grouping may be due to partial coherency assumption at the UE where SRS ports are coherent within a group but non-coherent across groups. In other cases, the port grouping may be due to some ports being sounded in one OFDM symbol while the other ports are sounded in the next OFDM symbol.

For an SRS resource with multiple antenna ports (e.g., 2, 4, 8), where SRS ports are divided into two or more groups of SRS ports, a configuration and/or indication per group of SRS ports may determine a cyclic shift value for each SRS port in that group. By configuring cyclic shift parameters and/or comb offset parameters on a per-group basis (rather than per SRS resource and/or per-SRS-port), the UE may more accurately transmit SRSs to multiple TRPs and more successfully avoid SRS interference. By improving SRS transmissions and by better avoiding SRS interference, the network entity and the UE may conserve processing resources and signaling resources.

Referring again to FIG. 1, in certain aspects, the UE 104 may be configured to perform a self-interference procedure. For example, the UE 104 of FIG. 1 may include SRS component 198 configured to receive a configuration for a plurality of groups of sounding reference signal (SRS) ports associated with an SRS resource, the configuration indicating one or more cyclic shift parameters for each group of SRS ports of the plurality of groups of SRS ports. The SRS component 198 also may be configured to transmit one or more SRSs using at least one group of SRS ports of the plurality of groups of SRS ports based at least in part on the one or more cyclic shift parameters of the at least one group of SRS ports.

Referring again to FIG. 1, in certain aspects, the base station 180 of FIG. 1 may include a SRS configuration component 199 configured to transmit a configuration for a plurality of groups of sounding reference signal (SRS) ports associated with an SRS resource, the configuration indicating one or more cyclic shift parameters for each group of SRS ports of the plurality of groups of SRS ports. The SRS configuration component 199 also may be configured to receive one or more SRSs of at least one group of SRS ports of the plurality of groups of SRS ports based at least in part on the one or more cyclic shift parameters of the at least one group of SRS ports.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
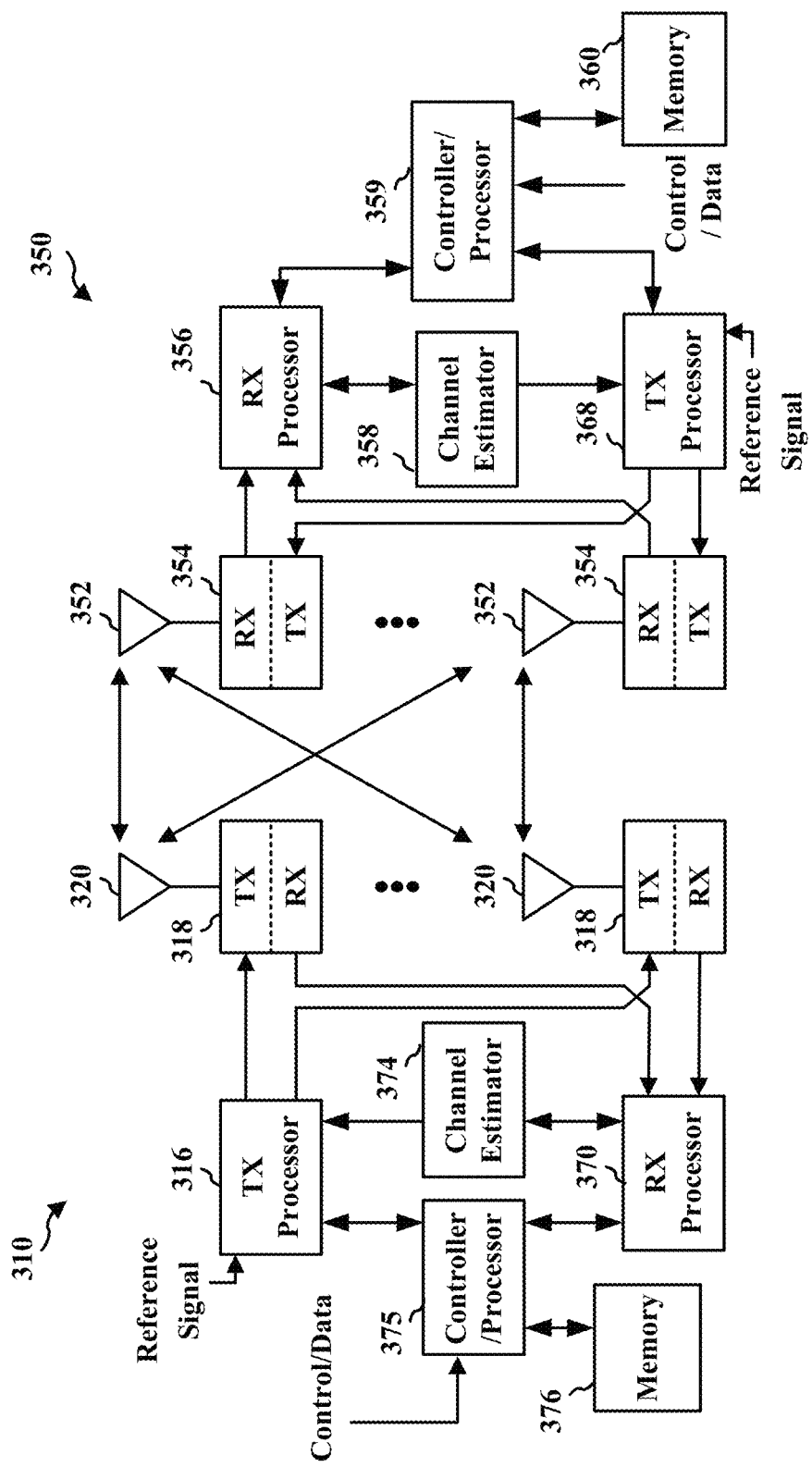
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
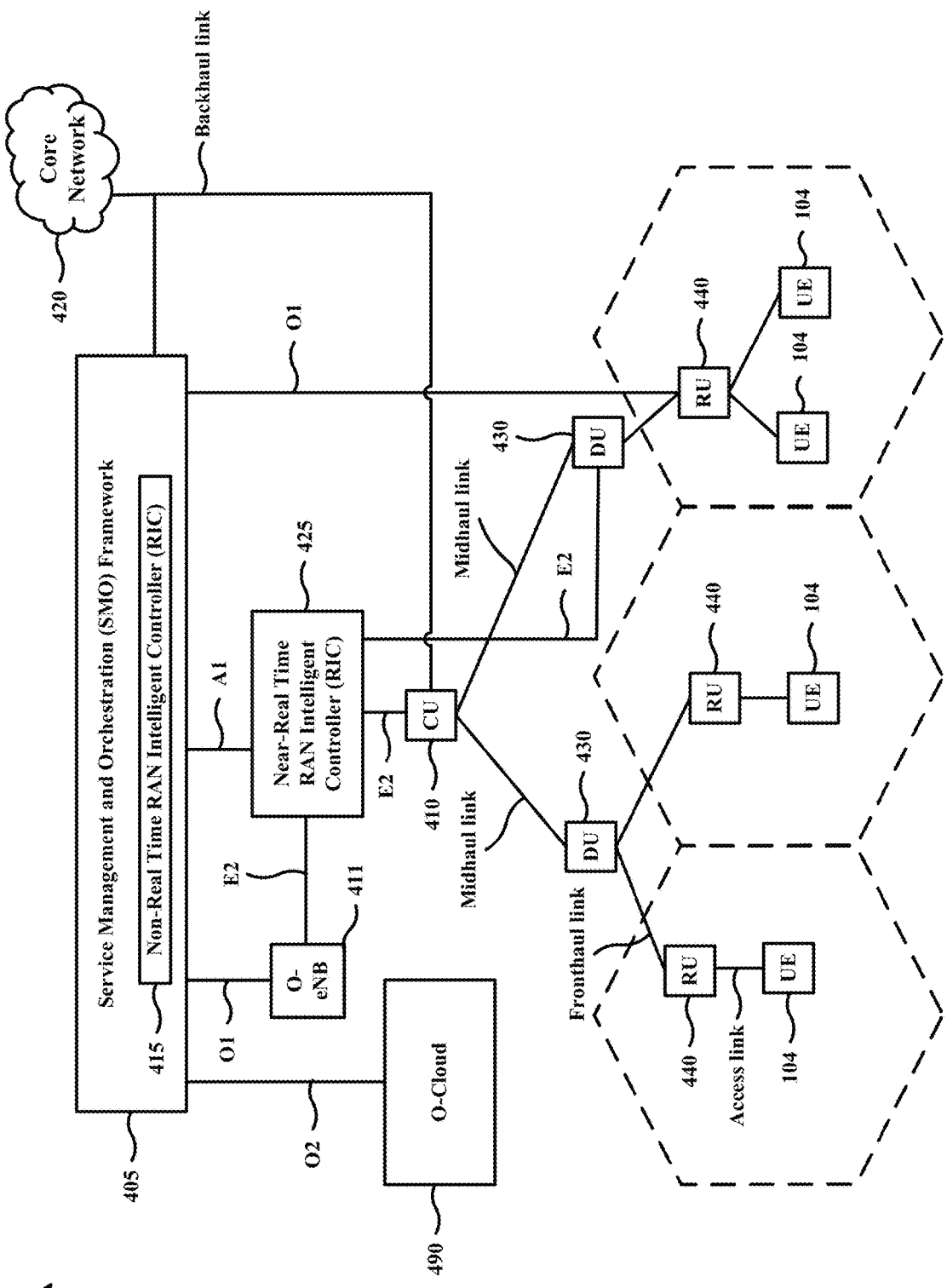
FIG. 4 is a diagram illustrating an example of a disaggregated base station, according to some implementations of the present disclosure.

FIG. 4 is a diagram illustrating an example of a disaggregated base station 400, in accordance with one or more implementations of the present disclosure. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 400 architecture may include one or more CUs 410 that can communicate directly with a core network 420 via a backhaul link, or indirectly with the core network 420 through one or more disaggregated base station units (such as a Near-RT RIC 425 via an E2 link, or a Non-RT RIC 415 associated with a Service Management and Orchestration (SMO) Framework 405, or both). A CU 410 may communicate with one or more DUs 430 via respective midhaul links, such as an F1 interface. The DUs 430 may communicate with one or more RUs 440 via respective fronthaul links. The fronthaul link, the midhaul link, and the backhaul link may be generally referred to as "communication links." The RUs 440 may communicate with respective UEs 104 via one or more RF access links. In some aspects, the UE 104 may be simultaneously served by multiple RUs 440. The DUs 430 and the RUs 440 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 4GPP. In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
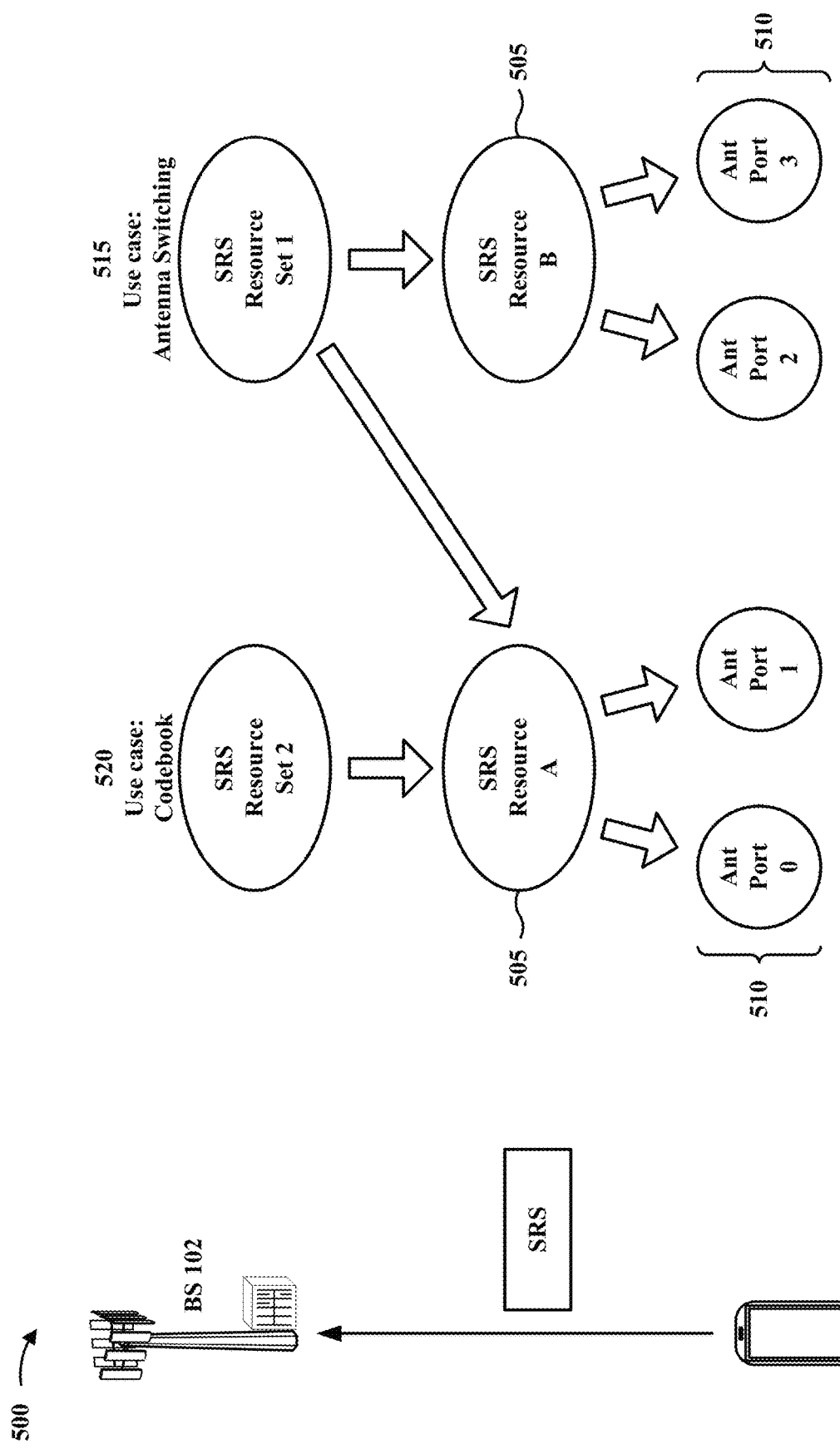
FIG. 5 is a diagram illustrating an example of sounding reference signal (SRS) resource sets, according to some implementations of the present disclosure.

FIG. 5 is a diagram illustrating an example 500 of SRS resource sets, in accordance with one or more implementations of the present disclosure. An uplink channel may include a physical uplink control channel (PUCCH) that carries uplink control information (UCI) or a physical uplink shared channel (PUSCH) that carries uplink data, among other examples. The uplink channel may also carry an uplink reference signal, such as a sounding reference signal (SRS). An SRS may carry information used for uplink channel estimation, which may be used for scheduling, link adaptation, precoder selection, or beam management, among other examples. The base station 102 may configure one or more SRS resource sets for the UE 104, and the UE 104 may transmit SRSs on the configured SRS resource sets. An SRS resource set may have a configured usage, such as uplink channel state information (CSI) acquisition, downlink CSI acquisition for reciprocity-based operations, uplink beam management, among other examples. The base station 102 may measure the SRSs, may perform channel estimation based at least in part on the measurements, and may use the SRS measurements to configure communications with the UE 104.

A base station 102 may configure a UE 104 with one or more SRS resource sets to allocate resources for SRS transmissions by the UE 104. For example, a configuration for SRS resource sets may be indicated in a radio resource control (RRC) message (e.g., an RRC configuration message or an RRC reconfiguration message). As shown by reference number 505, an SRS resource set may include one or more resources (e.g., shown as SRS resources), which may include time resources (e.g., a slot a symbols, a periodicity) and/or frequency resources (e.g., a resource block (RB)).

As shown by reference number 510, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, a base station 102 may use an antenna switching SRS (e.g., an SRS transmitted using a resource of an antenna switching SRS resource set) to acquire downlink CSI (e.g., to determine a downlink precoder to be used to communicate with the UE 104).

A codebook SRS resource set may be used to indicate uplink CSI when a base station 102 indicates an uplink precoder to the UE 104. For example, when the base station 102 is configured to indicate an uplink precoder to the UE 104 (e.g., using a precoder codebook), the base station 102 may use a codebook SRS (e.g., an SRS transmitted using a resource of a codebook SRS resource set) to acquire uplink CSI (e.g., to determine an uplink precoder to be indicated to the UE 104 and used by the UE 104 to communicate with the base station 102). In some aspects, virtual ports (e.g., a combination of two or more antenna ports) with a maximum transmit power may be supported at least for a codebook SRS.

A non-codebook SRS resource set may be used to indicate uplink CSI when the UE 104 selects an uplink precoder (e.g., instead of the base station 102 indicated an uplink precoder to be used by the UE 104. For example, when the UE 104 is configured to select an uplink precoder, the base station 102 may use a non-codebook SRS (e.g., an SRS transmitted using a resource of a non-codebook SRS resource set) to acquire uplink CSI. In this case, the non-codebook SRS may be precoded using a precoder selected by the UE 104 (e.g., which may be indicated to the base station 102).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using downlink control information (DCI) or a medium access control (MAC) control element (CE) (MAC CE)). An aperiodic SRS resource may be triggered dynamically, such as via DCI (e.g., UE-specific DCI or group common DCI).

In some aspects, the UE 104 may be configured with a mapping between SRS ports (e.g., antenna ports) and corresponding SRS resources. The UE 104 may transmit an SRS on a particular SRS resource using an SRS port indicated in the configuration. In some aspects, an SRS resource may span N adjacent symbols within a slot (e.g., where N equals 1, 2, or 5). The UE 104 may be configured with X SRS ports (e.g., where X≤5). In some aspects, each of the X SRS ports may mapped to a corresponding symbol of the SRS resource and used for transmission of an SRS in that symbol.

As shown in FIG. 5, in some aspects, different SRS resource sets indicated to the UE 104 (e.g., having different use cases) may overlap (e.g., in time and/or in frequency, such as in the same slot). For example, as shown by reference number 515, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 520, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 104 may not transmit codebook SRSs in SRS Resource B (e.g., the second time-frequency resource) using antenna port 2 and antenna port 3. As indicated above, FIG. 5 is provided as an example. Other examples may differ from what is described with regard to FIG. 5.

Figure 6:
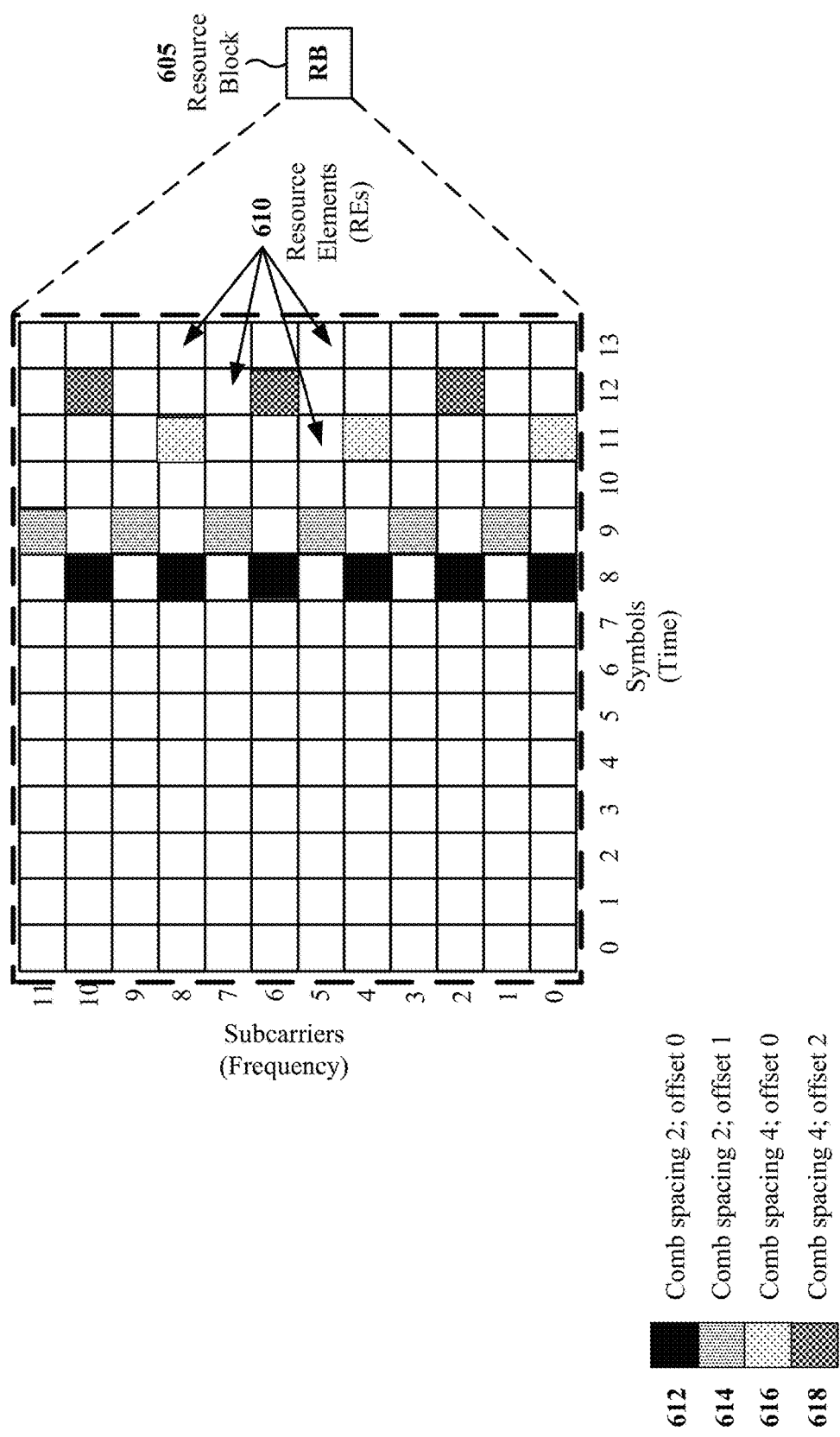
FIG. 6 is a diagram illustrating an example of a comb spacing and comb offset slot format, according to some implementations of the present disclosure.

FIG. 6 is a diagram illustrating an example 600 of a comb spacing and comb offsets slot format, in accordance with one or more implementations of the present disclosure. Time-frequency resources in a radio access network may be partitioned into RBs, sometimes referred to as physical resource blocks (PRBs). Example 600 shows an RB 605 that may include a set of subcarriers (e.g., 12 subcarriers) and a set of symbols (e.g., 14 symbols) that are schedulable by a base station 102 as a unit. In some aspects, an RB 605 may include a set of subcarriers in a single slot. As shown, a single time-frequency resource included in an RB 605 may be referred to as a resource element (RE) 610. An RE 610 may include a single subcarrier (e.g., in frequency) and a single symbol (e.g., in time). A symbol may be referred to as an OFDM symbol. An RE 610 may be used to transmit one modulated symbol, which may be a real value or a complex value.

In some telecommunication systems (e.g., NR), RBs 605 may span 12 subcarriers with a subcarrier spacing of, for example, 15 kilohertz (kHz), 30 kHz, 60 kHz, or 104 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

SRSs may be transmitted at different REs according to a comb pattern. A comb pattern may include a comb spacing, according to which SRSs may be spaced apart. Example 600 shows a comb spacing K Tc that can be configured as 2, 4, or 8 REs per SRS resource. SRS comb pattern 612 and SRS comb pattern 614 show a comb spacing of 2 REs in an OFDM symbol. SRS comb pattern 616 and SRS comb pattern 618 show a comb spacing of 4 REs in an OFDM symbol.

A comb pattern may also have a comb offset that indicates a shift of where the comb spacing starts (starting RE for an SRS). Example 600 shows a comb offset $\bar{K}_{TC}$ that can be configured as 0, 1, ..., $K_{TC}-1$ per SRS resource. SRS comb pattern 614 has an offset of 1 and starts at subcarrier 1 rather than subcarrier 0. SRS comb pattern 618 has an offset of 2 and starts at subcarrier 2 rather than subcarrier 0.

A cyclic shift for an SRS delays a starting time reference for an SRS, which may be a different time reference than for another SRS. A UE may transmit an SRS with a cyclic shift $n_{SRS}^{cs}$ that can be configured as 0, 1, ..., $n_{SRS}^{cs,max}-1$ per SRS resource. The cyclic shift may start with the first SRS port if the SRS resource is configured with more than one SRS port. The maximum quantity of cyclic shifts $n_{SRS}^{cs,max}$ depends on the comb spacing. For example, the maximum quantity of cyclic shifts $n_{SRS}^{cs,max}$ for a comb spacing of 2 may be 8, the maximum quantity of cyclic shifts $n_{SRS}^{cs,max}$ for a comb spacing of 4 may be 12, and the maximum quantity of cyclic shifts $n_{SRS}^{cs,max}$ for a comb spacing of 8 may be 6.

A transmission of an SRS with a cyclic shift for a base sequence may be represented as $e^{j\alpha_i n} \bar{r}_{u,v}(n)$, where $\alpha_i$ is the cyclic shift for SRS transmission index i, $\bar{r}_{u,v}(n)$ is the base sequence for n (quantity of RBs×quantity of REs/comb spacing $K_{TC}$), u is a group identifier (ID), and v is a sequential value ID. Here j is the imaginary unit, which is used to represent a complex number, for example, a+bj, where a and b are real numbers. $e^{jx}$ is a complex exponential function (a different form to represent a complex number cos x+j sinx). The cyclic shift $\alpha_i$ may be $$2\pi \frac{n_{SRS}^{cs,i}}{n_{SRS}^{cs,max}},$$

where $n_{SRS}^{cs,i}$ is $$\left( n_{SRS}^{cs} + \frac{n_{SRS}^{cs,max}(p_i - 1000)}{N_{ap}^{SRS}} \right) \mod n_{SRS}^{cs,max},$$

$n_{SRS}^{cs}$ is RRC-configured, $p_i$ is an antenna port number (starting from 1000), and $N_{ap}^{SRS}$ is the quantity of SRS ports.

Different cyclic shifts of the same base sequence are expected to be orthogonal, as long as the cyclic shift spacing does not become too small relative to the delay spread of the channel (difference between time of arrival of the earliest multi-path component and time of arrival of the latest multi-path component). Different cyclic shifts may be used for different SRS ports (in scenarios where an SRS resource has more than one SRS port) or for different SRS resources (either from the same UE or from different UEs). This may help ensure mutual orthogonality among all SRS ports of a given SRS resource, or among different SRS resources (of the same UE or of different UEs).

For 4-port SRS and in the case of comb spacing of 8, cyclic shifts may be handled differently since $n_{SRS}^{cs,max}=6$, which is not integer divisible by $n_{AP}^{SRS}=4$. For example, port 0 and port 2 may be mapped to the same comb offset $K_{TC}$ with $n_{CS}$, $n_{CS+3}$ respectively. In another example, port 1 and port 3 may be mapped to the same comb offset mod $(K_{TC}+4,8)$ with $n_{CS}$, $n_{CS+3}$ respectively. In this regard, $n_{SRS}^{cs,i}$ may be $$\left( n_{SRS}^{cs} + \frac{n_{SRS}^{cs,max} \left\lfloor \frac{(p_i - 1000)}{2} \right\rfloor}{N_{ap}^{SRS}/2} \right) \mod n_{SRS}^{cs,max}.$$

Even though different cyclic shifts (of the same base sequence) are theoretically orthogonal, in general, the larger the cyclic shift spacing between two SRS ports or SRS resources, the more resilient the SRS may be against a large delay spread and/or other implementation issues. Currently, for a given SRS resource with multiple ports, cyclic shifts are evenly distributed among the SRS ports, where the cyclic shift of the first port is RRC-configured for the SRS resource and represented as $d_0 = n_{SRS}^{cs}$. For 2 ports, the assigned cyclic shifts may be $(d_0+(0, 4))$ mod8 for a comb spacing of 2, $(d_0+(0, 6))$ mod12 for a comb spacing of 4, and $(d_0+(0, 3))$ mod6 for a comb spacing of 8. For 4 ports, the assigned cyclic shifts may be $(d_0+(0, 2, 4, 6))$ mod8 for a comb spacing of 2, $(d_0+(0, 3, 6, 9))$ mod12 for a comb spacing of 4, and $(d_0+(0,3))$ mod6 for a comb spacing of 8. For a comb spacing of 2 or 4, and when do is in the second half of antenna port cyclic shift values, ports (0,2) and (1,3) may have different comb offsets. For a comb spacing of 8, ports (0, 2) and (1, 3) may have the same cyclic shift but different comb offsets.

Given that only a subset of the maximum quantity of cyclic shifts is used for an SRS resource, other cyclic shifts may be used for other SRS resources (for the same UE or for different UEs). The maximum quantity of SRS resources that may be multiplexed on the same comb using different cyclic shifts of the same base sequence may be: for a comb spacing of 2, 8 for 1 antenna port, 4 for 2 antenna ports, or 2 for 4 antenna ports; for a comb spacing of 4, 12 for 1 antenna port, 6 for 2 antenna ports, or 3 for 4 antenna ports; and for a comb spacing of 8, 6 for 1 antenna port, 3 for 2 antenna ports, or 3 for 4 antenna ports (occupying two combs).

Figure 7:
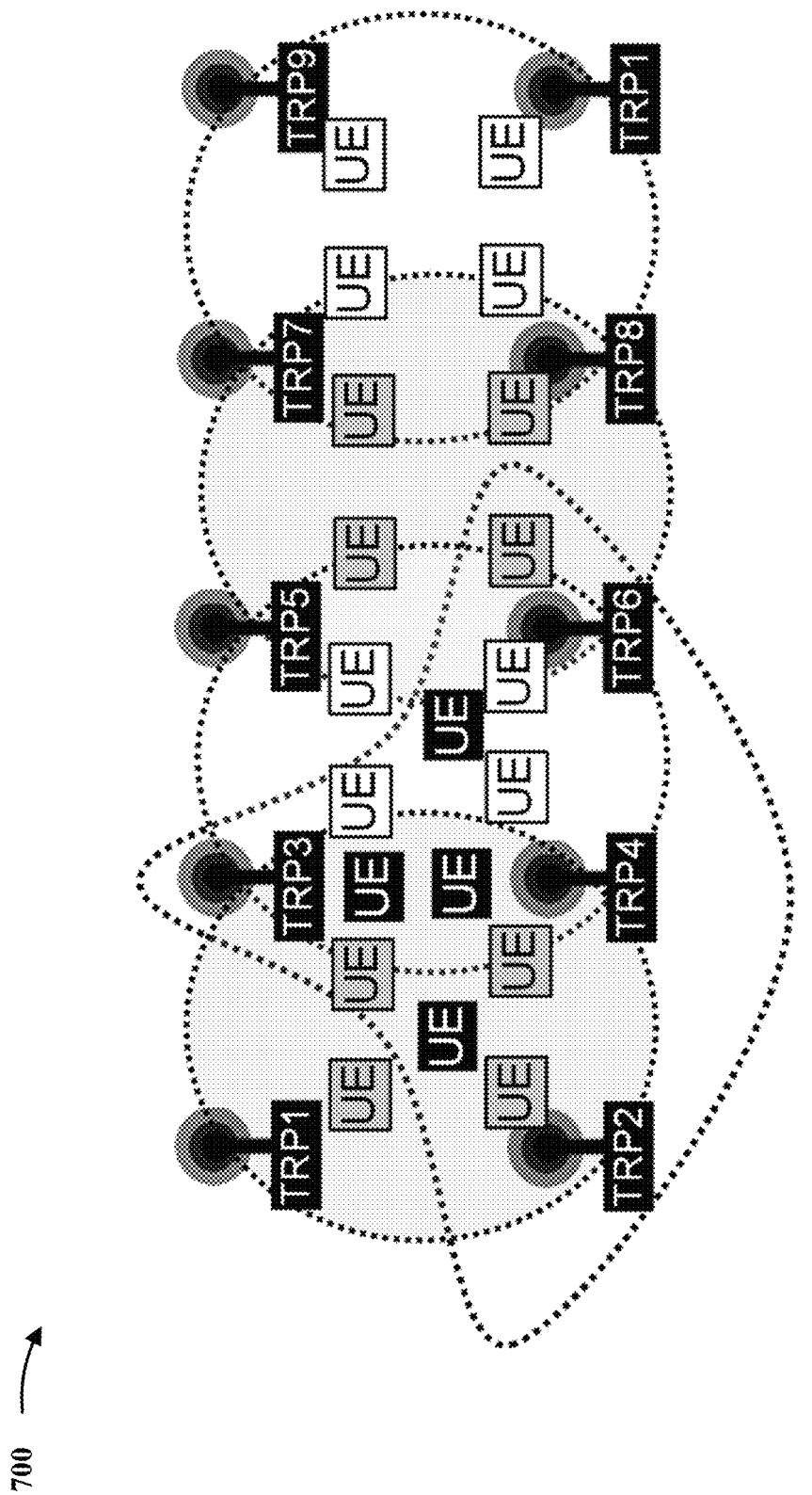
FIG. 7 is a diagram illustrating an example of multiple transmit-receive points (TRPs) that receive SRSs, according to some implementations of the present disclosure.

FIG. 7 is a diagram illustrating an example 700 of multiple TRPs that receive SRSs, in accordance with one or more implementations of the present disclosure. Example 700 shows clusters of 4 UEs that may each transmit an SRS to one of multiple TRPs. Coherent joint transmission (CJT) may involve beam-forming where the beam-forming antennas are not co-located but correspond to different TRPs. There may be SRS interference across the different UEs for CJT across the multiple TRPs, and any enhancements to address the SRS interference are expected to reuse existing SRS comb patterns. Example 700 shows that multiple TRPs may expect to receive an SRS from a given UE. For a large number of UEs, multiple UEs may need to send an SRS on the same OFDM symbols.

To account for SRS interference, a network entity may carefully assign comb offsets and cyclic shifts. However, it is not currently possible to configure a comb offset and a cyclic shift per SRS port in a given SRS resource. Rather, one comb offset and one comb cyclic shift are configured for an entire SRS resource. Cyclic shifts are evenly distributed among the SRS ports for the SRS resource. There is currently no flexibility to configure a comb offset or a cyclic shift for different SRS ports of an SRS resource.

In other words, different SRS ports are transmitted on the same REs (same comb offset) with exceptions (for 4 ports) that are not very flexible. For example, for a comb spacing of 4 with 12 cyclic shifts involving a first UE with 2 SRS ports and a second UE with 2 SRS ports, the first UE may be assigned cyclic shifts {0, 6} and the second UE may be assigned cyclic shifts {2, 8}. However, it is not possible to assign cyclic shifts {0, 2} to the first UE and cyclic shifts {6, 8} to the second UE. In another example, for a comb spacing of 4 with 12 cyclic shifts involving a first UE with 4 SRS ports and a second UE with 2 SRS ports, the first UE may be assigned cyclic shifts {0, 3, 6, 9} and the second UE may be assigned cyclic shifts {2, 8}. However, it is not possible to assign cyclic shifts {0, 1, 2, 3} to the first UE and cyclic shifts {7, 8} to the second UE (to maximize the inter-UE cyclic shift separation). The lack of flexibility in assigning cyclic shifts and comb spacing to SRS ports may cause some SRS transmissions to be degraded and retransmitted due to SRS interference. This may consume additional processing resources and signaling resources.

In some legacy approaches, a network entity may configure a UE with cycle shift parameters per SRS port for a given SRS resource. That is, cyclic shift parameters may be specific to each individual SRS port, whether the parameters are configured for one SRS port, for each of some of the SRS ports of the UE, or for each of all of the SRS ports of the UE. For example, the UE may be provided with explicit configuration and/or indication of cyclic shift parameters for each SRS port of an SRS resource. In some aspects, the configuration also may include cyclic shift spacing across consecutive SRS ports for an SRS resource. For 4 ports, and with cyclic shift spacing of 1, the assigned cyclic shifts may be $(d_0+(0, 1, 2, 3))$ mod12 for a comb spacing of 4, whereas with a cyclic shift spacing of 2, the assigned cyclic shifts may be $(d_0+(0, 2, 4, 6))$ mod12. By configuring cyclic shift parameters on a per-SRS-port basis (rather than per SRS resource), SRS enhancement may be achieved to manage inter-TRP cross-SRS interference targeting TDD CJT via SRS interference randomization and/or capacity enhancement.

However, the legacy cyclic shift configuration on a per-SRS-port basis for multi-port SRS does not take into account whether SRS ports have the same comb offset or have different comb offsets. In cases involving 4 SRS ports, two SRS ports may have one comb offset and the other two SRS ports may have another comb offset. For example, for a comb spacing of 2 or 4, and when do is in the second half of antenna port cyclic shift values, ports (0,2) and (1,3) have different comb offsets. In another example, for a comb spacing of 8 and $n_{SRS}^{cs,max}=6$, ports (0, 2) and (1, 3) may have the same cyclic shift but different comb offsets. Additionally, the legacy cyclic shift configuration on a per-SRS-port basis may not take into account the port grouping across SRS ports on a given SRS resource, which may be used for deciding the comb offset for a given SRS port. For example, the port grouping involving a UE with 4 ports may be grouped with two ports (1000, 1002) belonging to one group and the other two ports (1001, 1003) belonging to another group. In some cases, the port grouping may be due to partial coherency assumption at the UE where SRS ports are coherent within a group but non-coherent across groups. In other cases, the port grouping may be due to some ports being sounded in one OFDM symbol while the other ports are sounded in the next OFDM symbol.

For an SRS resource with multiple antenna ports (e.g., 2, 4, 8), where SRS ports are divided into two or more groups of SRS ports, a configuration and/or indication per group of SRS ports may determine a cyclic shift value for each SRS port in that group. By configuring cyclic shift parameters and/or comb offset parameters on a per-group basis (rather than per SRS resource and/or per-SRS-port), the UE may more accurately transmit SRSs to multiple TRPs and more successfully avoid SRS interference. By improving SRS transmissions and by better avoiding SRS interference, the network entity and the UE may conserve processing resources and signaling resources.

Figure 8:
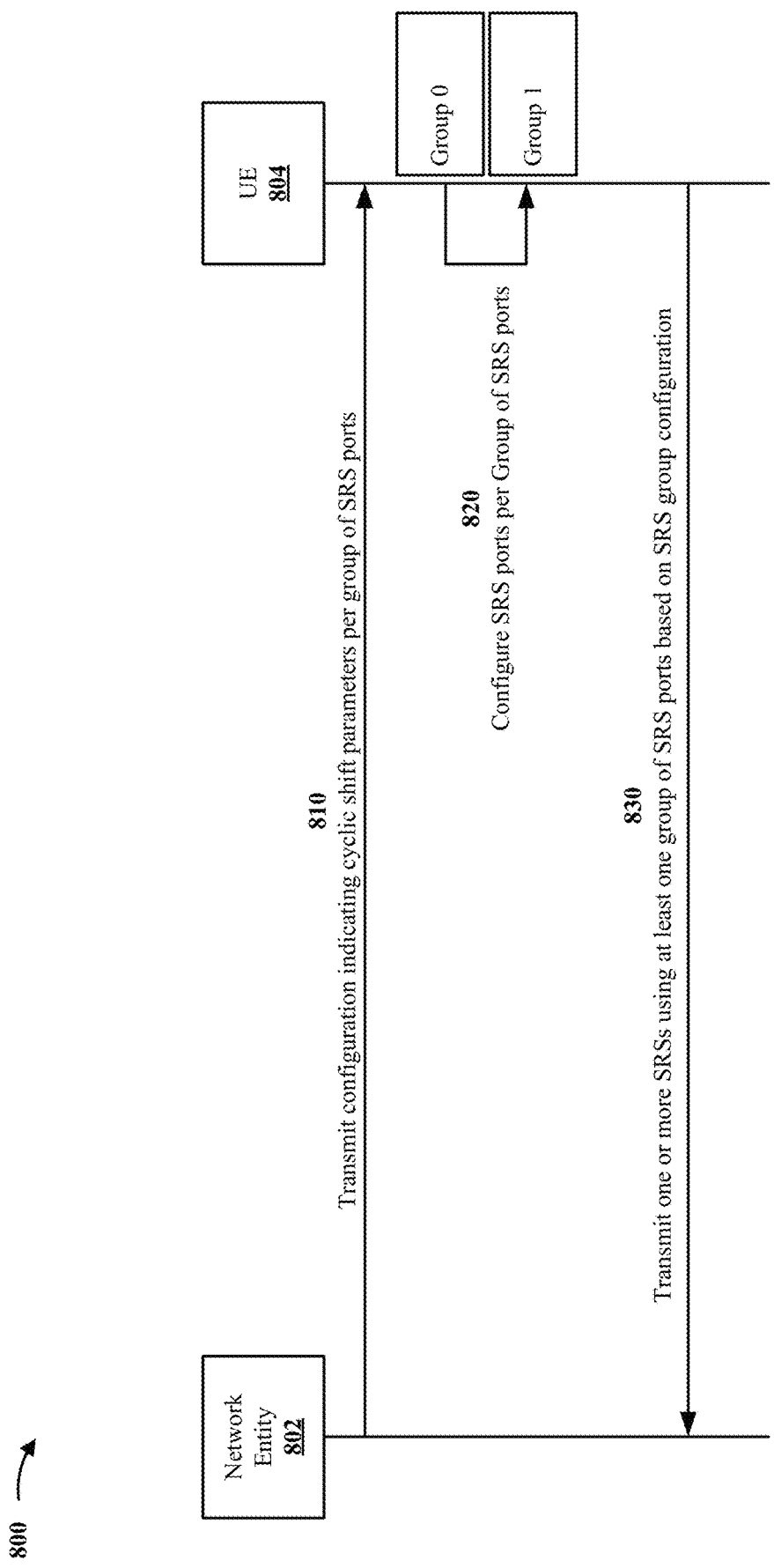
FIG. 8 is a diagram illustrating an example associated with configuring cyclic shift parameters per group of SRS ports, according to some implementations of the present disclosure.

FIG. 8 is a diagram illustrating an example 800 associated with configuring cyclic shift parameters per group of SRS ports, in accordance with some implementations of the present disclosure. As shown in FIG. 8, a network entity 802

(e.g., base station 102) and a UE 804 (e.g., a UE 104) may communicate with one another.

According to various aspects described herein, a network entity may configure a UE with cycle shift parameters per group of SRS ports for a given SRS resource. That is, cyclic shift parameters may be specific to each group of SRS ports, whether the parameters are configured for at least one SRS port across groups of SRS ports, for each SRS port of some of the groups of SRS ports of the UE, or for each SRS port of all of the groups of SRS ports of the UE. By configuring cyclic shift parameters on a per-group basis (rather than per SRS resource and/or per-SRS-port), the UE may more accurately transmit SRSs to multiple TRPs and more successfully avoid SRS interference. By improving SRS transmissions and by better avoiding SRS interference, the network entity and the UE may conserve processing resources and signaling resources.

Example 800 shows an example per-group configuration. The UE 804 may have multiple groups of SRS ports, such as groups 0 and 1. As shown by reference number 810, the network entity 802 may transmit a configuration that indicates cyclic shift parameters for each port in a specified group of SRS ports. In some aspects, the one or more cyclic shift parameters per group of SRS ports may include antenna port cyclic shift values that correspond to multiple SRS ports of that group.

In some aspects, the configuration may indicate a cyclic shift value for a first SRS port (e.g., Port 0) in a first group of SRS ports (e.g., Group 0), and the cyclic shift values for other SRS ports in the group are evenly and uniformly distributed. For example, with 4 SRS ports and a comb spacing of 4, there are 12 cyclic shifts in total, in which the grouping involves two groups with each group having two SRS ports.

With a first port in a first group of SRS ports being configured with a cyclic shift value of 0, the two ports in the first group have respective cyclic shift values of 0 and 6. With a first port in a second group of SRS ports being configured with a cyclic shift value of 2, the two ports in the second group have respective shift values of 2 and 8.

In some aspects, the configuration may indicate a cyclic shift value for a first port in a group of SRS ports and further indicate that cyclic shift spacing is common to multiple groups of SRS ports (in which the configuration is not per group of SRS ports). In some aspects, the configuration is applied separately per group of SRS ports to determine cyclic shifts of SRS ports in a specified group. For example, with 4 ports and a cyclic shift spacing of 2, the configuration may indicate that the cyclic shift spacing is $(d_0+\{0, 2, 4, 6\})$ mod 12 (for a comb spacing of 4). In one example, the cyclic shift for a first port (e.g., Port 0) in a first group (e.g., Group 0) is configured as 0, such that the SRS ports in the first group have respective cyclic shift values of 0 and 2. In another example, the cycle shift for a first port (e.g., Port 0) in a second group (e.g., Group 1) is configured as 1, such that the SRS ports in the second group have respective cyclic shifts of 1 and 3.

In some aspects, the configuration may indicate a cyclic shift value for a first port in a group of SRS ports and further indicate that cyclic shift spacing is configured per group of SRS ports. In some aspects, the configuration is applied separately per group of SRS ports to determine cyclic shifts of SRS ports in a specified group. For example, with 4 ports, the configuration applied to a specific group may indicate that the cyclic shift spacing is 2 for that group.

In one example, the cyclic shift for a first port (e.g., Port 0) in a first group (e.g., Group 0) is configured as 0 involving a cyclic shift spacing of 2, such that the SRS ports in the first group have respective cyclic shift values of 0 and 2. The cycle shift for a first port (e.g., Port 0) in a second group (e.g., Group 1) is configured as 1 involving a cyclic shift spacing of 4, such that the SRS ports in the second group have respective cyclic shifts of 1 and 5.

In some aspects, the configuration may indicate which port belongs to which group of SRS ports. In one aspect, based on the comb offsets assigned to the ports, ports assigned to the same comb offset belong to the same group of SRS ports. In another aspect, the grouping may be based on an assigned port number. For example, SRS ports {1000, 1002} may belong to one group, and SRS ports {1001, 1003} may belong to another group. Alternatively, SRS ports {1000, 1001, 1002, 1003} may belong to one group, and SRS ports 11004, 1005, 1006, 10071 may belong to another group.

In one aspect, the grouping may be based on a coherency assumption among the SRS ports. For example, coherent ports may belong to the same group of SRS ports. In another aspect, the grouping may be based on an OFDM symbol on which a port is transmitted.

In some aspects, configuration providing an indication of a cyclic shift value for at least one group of SRS ports may impact the determination of whether multiple SRS ports have the same comb offset. In the case of 4 ports and comb spacing of 2 or 4 with a maximum number of cyclic shifts $n_{SRS}^{cs,max}$ of 12 or 8, the determination of whether the SRS ports have the same comb offset or not is based on whether the configured cyclic shift value for a first port is in the second half or not (e.g., whether $$n_{SRS}^{cs} \in \left\{ \frac{n_{SRS}^{cs,max}}{2}, \ldots , n_{SRS}^{cs,max} - 1 \right\} \right).$$

In one aspect, if the cyclic shift value corresponding to a first SRS port of a SRS resource (irrespective of which group) is in the second half of all possible cyclic shift values, then different groups of SRS ports have different comb offsets. In the case of a cyclic shift value being configured per port (irrespective of grouping), the first configured cyclic shift value for the first port may be relied upon to make this determination. In another aspect, if a configured cyclic shift value corresponding to a first SRS port of a first group (or the first SRS port of at least one group among multiple groups of SRS ports) is in the second half of possible cyclic shift values, then different groups have different comb offsets. In still another aspect, the presence of per-group configuration may imply that different groups have different comb offset parameters. For example, a cyclic shift value of a first SRS port in each group of SRS ports that is separately configured may serve as an implicit indication that different comb offset parameters are used across multiple groups of SRS ports.

As shown by reference number 820, the UE 804 may configure the SRS ports by group based at least in part on the configuration. As shown by reference number 830, the UE 804 may transmit SRSs from the SRS ports using the per-group parameters.

Figure 9:
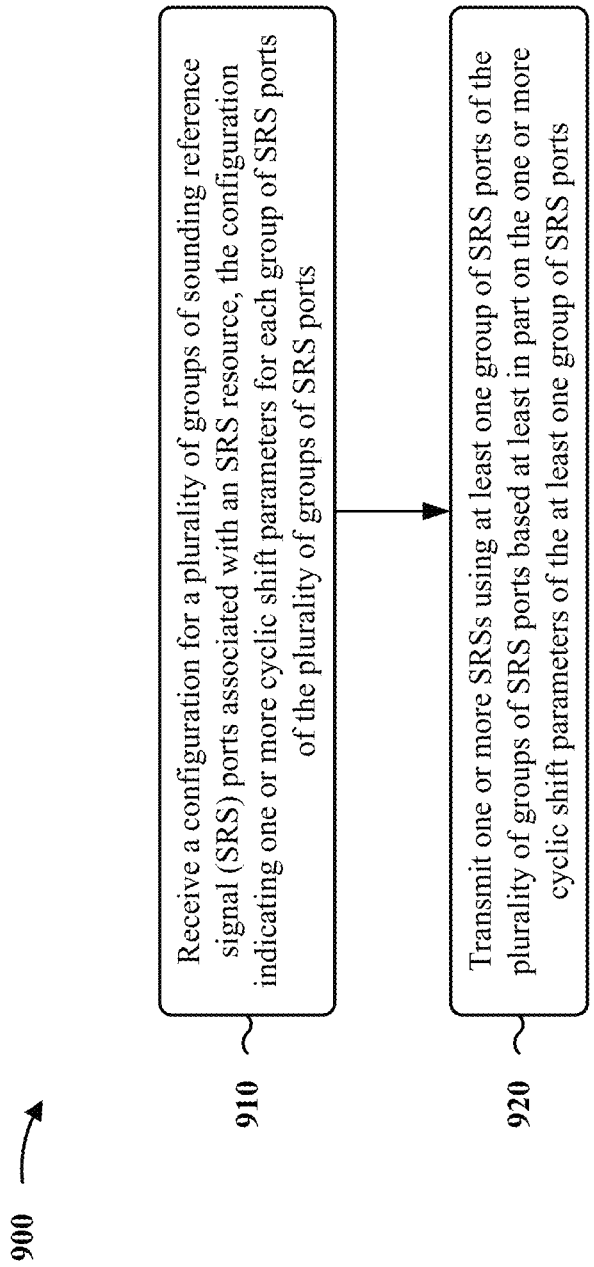
FIG. 9 is a flowchart of a method of wireless communication at a user equipment that supports enhanced cyclic shift configuration for multi-port SRS, according to some implementations of the present disclosure.

FIG. 9 is a flowchart of a process 900 of wireless communication. The process 900 may be performed by a UE or a component of a UE (e.g., the UE 104, 804, 1102; the device 350; a processing system, which may include the memory and components configured to perform each of the blocks of the process, and which may be the entire UE or a component of the UE, such as the TX processor 368, the RX processor 356, and/or the controller/processor 359). According to various aspects, one or more of the illustrated operation of the process 900 may be omitted, transposed, and/or contemporaneously performed. Optional aspects are illustrated with a dashed line.

At 910, the UE may receive a configuration for a plurality of groups of SRS ports associated with an SRS resource, the configuration indicating one or more cyclic shift parameters for each group of SRS ports of the plurality of groups of SRS ports.

At 920, the UE may transmit one or more SRSs using at least one group of SRS ports of the plurality of groups of SRS ports based at least in part on the one or more cyclic shift parameters of the at least one group of SRS ports.

Process 900 may include additional aspects, such as any single aspect or any combination of aspects described below and/or in connection with one or more other processes described elsewhere herein.

In some aspects, the UE can determine an antenna port cyclic shift value for each SRS port in the at least one group of SRS ports based on the one or more cyclic shift parameters corresponding to the at least one group of SRS ports.

In some aspects, the one or more cyclic shift parameters may indicate an antenna port cyclic shift value for a first SRS port in the at least one group of SRS ports. In an aspect, cyclic shift values for other SRS ports within the at least one group of SRS ports are uniformly distributed based on the antenna port cyclic shift value of the first SRS port.

In some aspects, the configuration indicates a value for a cyclic shift spacing across consecutive SRS ports in the at least one group of SRS ports, in which the value for the cyclic shift spacing is common among the plurality of groups of SRS ports, and the process further includes determining an antenna port cyclic shift value for each SRS port in the at least one group of SRS ports based on the value for the cyclic shift spacing being applied separately for each group of SRS ports of the plurality of groups of SRS ports In some aspects, the configuration indicates a value for a cyclic shift spacing across consecutive SRS ports in the at least one group of SRS ports, in which the value for the cyclic shift spacing is unique to the at least one group of SRS ports, and the process further includes determining an antenna port cyclic shift value for each SRS port in the at least one group of SRS ports based on the value for the cyclic shift spacing being applied separately for each group of SRS ports of the plurality of groups of SRS ports.

In some aspects, the plurality of groups of SRS ports includes a total number of four or more SRS ports. In this regard, the UE can determine whether the antenna port cyclic shift value of a first SRS port in the SRS resource is a value in a first half of antenna port cyclic shift values or a value in a second half of antenna port cyclic shift values. In an aspect, different groups of the plurality of groups of SRS ports are configured with a same comb offset value based on the antenna port cyclic shift value of the first SRS port in the SRS resource being the value in the first half of antenna port cyclic shift values. In another aspect, different groups of the plurality of groups of SRS ports are configured with different comb offset values based on the antenna port cyclic shift value of the first SRS port in the SRS resource being the value in the second half of antenna port cyclic shift values.

In some aspects, the plurality of groups of SRS ports includes a total number of four or more SRS ports. In this regard, the UE can determine whether the antenna port cyclic shift value of a first SRS port in the at least one group of SRS ports of the plurality of groups of SRS ports is a value in a first half of antenna port cyclic shift values or a value in a second half of antenna port cyclic shift values. In an aspect, different groups of the plurality of groups of SRS ports are configured with a same comb offset value based on the antenna port cyclic shift value of the first SRS port in the at least one group of SRS ports being the value in the first half of antenna port cyclic shift values. In another aspect, different groups of the plurality of groups of SRS ports are configured with different comb offset values based on the antenna port cyclic shift value of the first SRS port in the at least one group of SRS ports being the value in the second half of antenna port cyclic shift values.

In some aspects, the UE can determine that different groups of the plurality of groups of SRS ports are configured with different comb offset values based on at least one SRS port of each group of SRS ports of the plurality of groups of SRS ports being separately configured with a respective antenna port cyclic shift value.

In some aspects, the configuration further indicates a different port number corresponding to each SRS port of each group of SRS ports of the plurality of groups of SRS ports, in which each group of SRS ports of the plurality of groups of SRS ports is configured with a specified quantity of SRS ports based on an order of the port numbers corresponding to SRS ports of the group of SRS ports.

In some aspects, the configuration further indicates that each group of SRS ports of the plurality of groups of SRS ports includes SRS ports that are coherent to one another within the group.

In some aspects, the configuration further indicates that each group of SRS ports of the plurality of groups of SRS ports is grouped with respective SRS ports based on a symbol on which a respective SRS port is transmitted. For example, SRS ports transmitted on a same symbol belong to a same group of SRS ports of the plurality of groups of SRS ports. In another example, SRS ports transmitted on different symbols belong to different respective groups of the plurality of groups of SRS ports.

The process 900 in FIG. 9 may be performed by an apparatus that includes components configured to perform each of the blocks of the algorithm in the aforementioned flowchart of FIG. 9 and/or the aspects described in connection with the apparatus 1102 in FIG. 11. As such, each block in the aforementioned flowchart of FIG. 9 and/or the aspects described in connection with FIG. 11 may be performed by a component and the apparatus may include one or more of those components. The components may be one or more hardware components specifically configured to carry out the stated processes/algorithm, implemented by at least one processor (e.g., controller/processor 359, RX processor 356, and/or TX processor 368 with reference to FIG. 3) configured to perform the stated processes/algorithm, stored within a computer-readable medium (e.g., memory 360) storing computer executable code that—when executed by a processor—instruct the processor to perform aspects of FIGS. 9 and/or 11, or some combination thereof.

Figure 10:
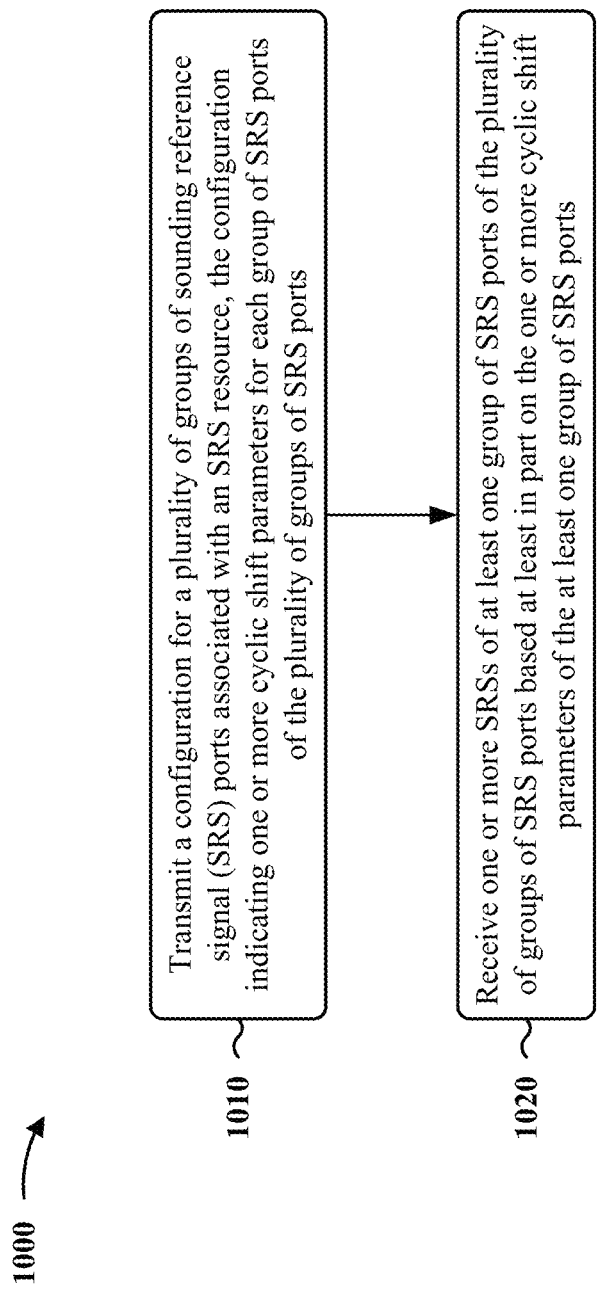
FIG. 10 is a flowchart of a method of wireless communication at a base station that supports enhanced cyclic shift configuration for multi-port SRS, according to some implementations of the present disclosure.

FIG. 10 is a flowchart of a process 1000 of wireless communication. The process may be performed by a base station or a component of a base station (e.g., the base station 102, 180, 802, 1202; the device 310; a processing system, which may include the memory and component configured to perform each of the blocks of the process, and which may be the entire base station or a component of the base station, such as the TX processor 316, the RX processor 370, and/or the controller/processor 375). According to various aspects, one or more of the illustrated operations of the process 1000 may be omitted, transposed, and/or contemporaneously performed. Optional aspects are illustrated with a dashed line.

At 1010, the base station may transmit a configuration for a plurality of groups of sounding reference signal (SRS) ports associated with an SRS resource, the configuration indicating one or more cyclic shift parameters for each group of SRS ports of the plurality of groups of SRS ports.

At 1020, the base station may receive one or more SRSs of at least one group of SRS ports of the plurality of groups of SRS ports based at least in part on the one or more cyclic shift parameters of the at least one group of SRS ports.

Process 1000 may include additional aspects, such as any single aspect or any combination of aspects described below and/or in connection with one or more other processes described elsewhere herein.

In some aspects, the base station may determine an antenna port cyclic shift value for each SRS port in the at least one group of SRS ports based on the one or more cyclic shift parameters corresponding to the at least one group of SRS ports.

In some aspects, the one or more cyclic shift parameters indicate an antenna port cyclic shift value for a first SRS port in the at least one group of SRS ports. In other aspects, cyclic shift values for other SRS ports within the at least one group of SRS ports are uniformly distributed based on the antenna port cyclic shift value of the first SRS port.

In some aspects, the base station may determine a value for a cyclic shift spacing across consecutive SRS ports in the at least one group of SRS ports, in which the value for the cyclic shift spacing is common among the plurality of groups of SRS ports. The base station also may determine an antenna port cyclic shift value for each SRS port in the at least one group of SRS ports based on the value for the cyclic shift spacing being applied separately for each group of SRS ports of the plurality of SRS ports.

In other aspects, the base station may determine a value for a cyclic shift spacing across consecutive SRS ports in the at least one group of SRS ports, in which the value for the cyclic shift spacing is unique to the at least one group of SRS ports. The base station also may determine an antenna port cyclic shift value for each SRS port in a first group of SRS ports based on the value for the cyclic shift spacing being applied separately for each group of SRS ports of the plurality of groups of SRS ports.

In some aspects, the plurality of groups of SRS ports includes a total number of four or more SRS ports. In this regard, the base station can determine whether the antenna port cyclic shift value of a first SRS port in the SRS resource is a value in a first half of antenna port cyclic shift values or a value in a second half of antenna port cyclic shift values. The base station can configure different groups of the plurality of groups of SRS ports with a same comb offset value based on the antenna port cyclic shift value of the first SRS port in the SRS resource being the value in the first half of antenna port cyclic shift values. In some aspects, the network entity also may configure different groups of the plurality of groups of SRS ports with different comb offset values based on the antenna port cyclic shift value of the first SRS port in the SRS resource being the value in the second half of antenna port cyclic shift values.

In other aspects, the base station can configure different groups of the plurality of groups of SRS ports with a same comb offset value based on the antenna port cyclic shift value of the first SRS port in the at least one group of SRS ports being the value in the first half of antenna port cyclic shift values. In still other aspects, the base station can configure different groups of the plurality of groups of SRS ports with different comb offset values based on the antenna port cyclic shift value of the first SRS port in the at least one group of SRS ports being the value in the second half of antenna port cyclic shift values.

In some aspects, the base station can configure at least one SRS port of each group of SRS ports of the plurality of groups of SRS ports separately with a respective antenna port cyclic shift value. In other aspects, the base station can configure different groups of the plurality of groups of SRS ports with different comb offset values based on the at least one SRS port of each group of SRS ports being separately configured with the respective antenna port cyclic shift value.

In some aspects, the configuration further indicates a different port number corresponding to each SRS port of each group of SRS ports of the plurality of groups of SRS ports. In an aspect, the base station can configure each group of SRS ports of the plurality of groups of SRS ports with a specified quantity of SRS ports based on an order of the port numbers corresponding to SRS ports of the group of SRS ports.

The process of FIG. 10 may be performed by an apparatus that includes components configured to perform each of the blocks of the algorithm in the aforementioned flowchart of FIG. 10 and/or aspects described in connection with the base station 1204 in FIG. 12. As such, each block in the aforementioned flowchart of FIG. 10 and/or the aspects described in connection with FIG. 12 may be performed by a component and the apparatus may include one or more of those component. The components may be one or more hardware components specifically configured to carry out the stated processes/algorithm, implemented by at least one processor configured to perform the stated processes/algorithm (e.g., controller/processor 375, TX processor 316, and/or RX processor 370 with reference to FIG. 3), stored within a computer-readable medium (e.g., memory 376) storing computer executable code that—when executed by a processor—instruct the processor to perform aspects of FIGS. 10 and/or 12, or some combination thereof.

Figure 11:
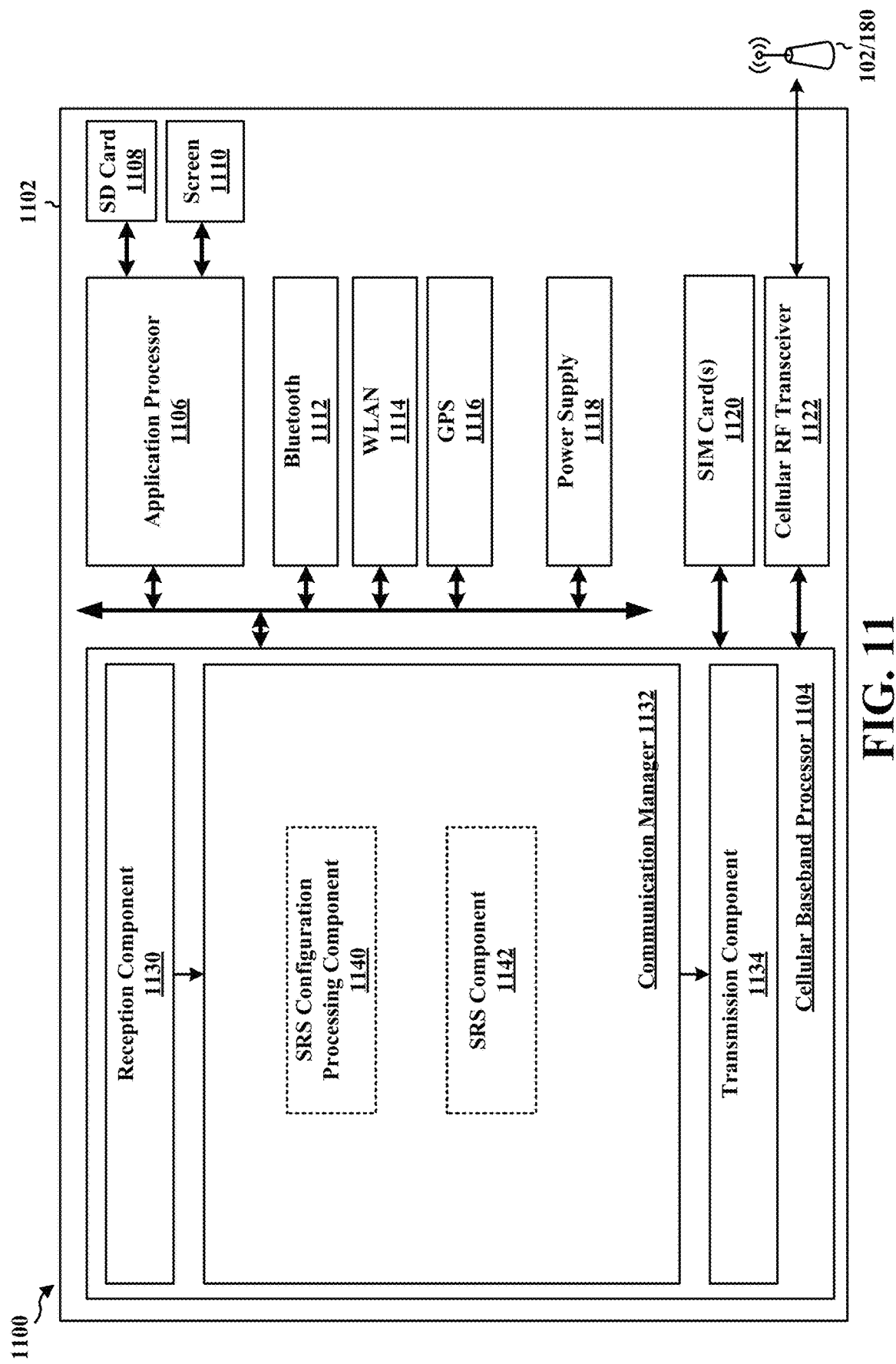
FIG. 11 is a diagram illustrating an example of a hardware implementation for an example apparatus that supports enhanced cyclic shift configuration for multi-port SRS, according to some implementations of the present disclosure.

FIG. 11 is a diagram 1100 illustrating an example of a hardware implementation for an apparatus 1102. The apparatus 1102 includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with other wireless devices, such as a UE 104 and/or base station 102/180. The cellular baseband processor 1104 may include a computer-readable medium/memory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 104 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire wireless device (e.g., see the UE 104 of FIG. 3) and include the additional modules of the apparatus 1102.

The communication manager 1132 includes a SRS configuration processing component 1140 and/or a SRS component 1142 configured to perform the aspects described in connection with the process in FIG. 9. The apparatus is illustrated as including components to perform the process of FIG. 9, because the wireless device may operate as a transmitting device at times and may operate as a receiving device at other times.

The apparatus 1102 may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The apparatus 1102 may include means for receiving a configuration for a plurality of groups of SRS ports associated with an SRS resource, the configuration indicating one or more cyclic shift parameters for each group of SRS ports of the plurality of groups of SRS ports. For example, the SRS configuration processing component 1140 may receive the configuration for the plurality of groups of SRS ports associated with an SRS resource. The apparatus 1102 also includes means for transmitting one or more SRSs using at least one group of SRS ports of the plurality of groups of SRS ports based at least in part on the one or more cyclic shift parameters of the at least one group of SRS ports. For example, the SRS component 1142 may transmit one or more SRSs, to the network entity, using at least one group of SRS ports of the plurality of groups of SRS ports.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
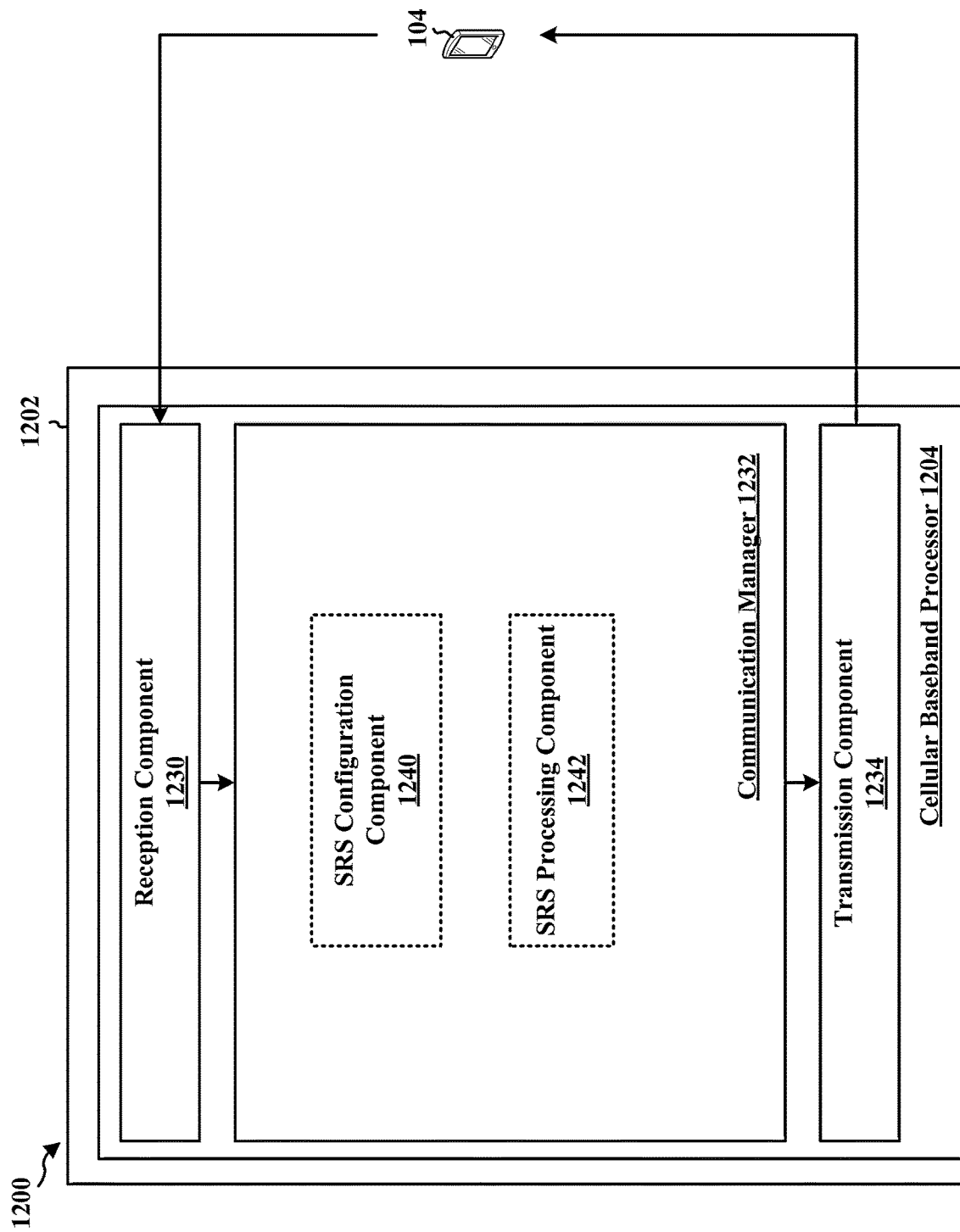
FIG. 12 is a diagram illustrating an example of a hardware implementation for an example apparatus that supports enhanced cyclic shift configuration for multi-port SRS, according to some implementations of the present disclosure.

FIG. 12 is a diagram 1200 illustrating an example of a hardware implementation for an apparatus 1202. The apparatus 1202 may be a base station or other wireless device that communicates based on downlink/uplink. The apparatus 1202 includes a cellular baseband processor 1204 (also referred to as a modem) coupled to a RF transceiver 1224, a processor 1220 and a memory 1222. The cellular baseband processor 1204 communicates through the RF transceiver 1224 with other wireless devices, such as a UE 104. The cellular baseband processor 1204 may include a computer-readable medium/memory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The processor 1220 is responsible for general processing, including the execution of software stored on the computer-readable medium/memory 1222. The software, when executed by the processor 1220, causes the apparatus 1202 to perform the various functions described supra for any particular apparatus. The computer-readable medium/memory 1222 may also be used for storing data that is manipulated by the processor 1220 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the base station 102/180 and may include the memory 376 and/or at least one of the TX processor 316, the RX processor 370, and the controller/processor 375. In one configuration, the apparatus 1202 may be a modem chip and include just the baseband processor 1204, and in another configuration, the apparatus 1202 may be the entire wireless device (e.g., see the base station 102/180 of FIG. 3) and include the additional modules of the apparatus 1202.

The communication manager 1232 includes a SRS configuration component 1240 and/or a SRS processing component 1242 configured to perform the aspects described in connection with the process in FIG. 10. The apparatus is illustrated as including components to perform the process in FIG. 10, because the wireless device may operate as a transmitting device at times and may operate as a receiving device at other times. In other examples, the apparatus 1202 may include components for the process of FIG. 10.

The apparatus 1202 may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The apparatus 1202 may further include means for transmitting a configuration for a plurality of groups of SRS ports associated with an SRS resource, the configuration indicating one or more cyclic shift parameters for each group of SRS ports of the plurality of groups of SRS ports. For example, the SRS configuration component 1240 may configure the UE by transmitting, to the UE, the configuration for the plurality of groups of SRS ports associated with an SRS resource. The apparatus 1202 also includes means for receiving, from the UE, one or more SRSs of at least one group of SRS ports of the plurality of groups of SRS ports based at least in part on the one or more cyclic shift parameters of the at least one group of SRS ports. For example, the SRS processing component 1242 may receive the one or more SRSs of at least one group of SRS ports of the plurality of groups of SRS ports.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following aspects are illustrative only and may be combined with aspects of other implementations or teachings described herein, without limitation.

Aspect 1 is a method of wireless communication performed by a user equipment (UE) that includes receiving a configuration for a plurality of groups of sounding reference signal (SRS) ports associated with an SRS resource, the configuration indicating one or more cyclic shift parameters for each group of SRS ports of the plurality of groups of SRS ports. The method also includes transmitting one or more SRSs using at least one group of SRS ports of the plurality of groups of SRS ports based at least in part on the one or more cyclic shift parameters of the at least one group of SRS ports.

In Aspect 2, the method of Aspect 1 further includes determining an antenna port cyclic shift value for each SRS port in the at least one group of SRS ports based on the one or more cyclic shift parameters corresponding to the at least one group of SRS ports.

In Aspect 3, the method of Aspects 1 or 2 further includes that the one or more cyclic shift parameters indicate an antenna port cyclic shift value for a first SRS port in the at least one group of SRS ports, and wherein cyclic shift values for other SRS ports within the at least one group of SRS ports are uniformly distributed based on the antenna port cyclic shift value of the first SRS port.

In Aspect 4, the method of Aspect 3 further includes that the configuration indicates a value for a cyclic shift spacing across consecutive SRS ports in the at least one group of SRS ports, wherein the value for the cyclic shift spacing is common among the plurality of groups of SRS ports, and wherein the method further comprises determining an antenna port cyclic shift value for each SRS port in the at least one group of SRS ports based on the value for the cyclic shift spacing being applied separately for each group of SRS ports of the plurality of groups of SRS ports.

In Aspect 5, the method of Aspect 3 further includes that the configuration indicates a value for a cyclic shift spacing across consecutive SRS ports in the at least one group of SRS ports, wherein the value for the cyclic shift spacing is unique to the at least one group of SRS ports, and wherein the method further comprises determining an antenna port cyclic shift value for each SRS port in the at least one group of SRS ports based on the value for the cyclic shift spacing being applied separately for each group of SRS ports of the plurality of groups of SRS ports.

In Aspect 6, the method of Aspect 3 further includes that the plurality of groups of SRS ports includes a total number of four or more SRS ports, and further includes determining whether the antenna port cyclic shift value of a first SRS port in the SRS resource is a value in a first half of antenna port cyclic shift values or a value in a second half of antenna port cyclic shift values, and wherein different groups of the plurality of groups of SRS ports are configured with a same comb offset value based on the antenna port cyclic shift value of the first SRS port in the SRS resource being the value in the first half of antenna port cyclic shift values, wherein different groups of the plurality of groups of SRS ports are configured with different comb offset values based on the antenna port cyclic shift value of the first SRS port in the SRS resource being the value in the second half of antenna port cyclic shift values.

In Aspect 7, the method of Aspect 3 further includes that the plurality of groups of SRS ports includes a total number of four or more SRS ports, the further includes determining whether the antenna port cyclic shift value of a first SRS port in the at least one group of SRS ports of the plurality of groups of SRS ports is a value in a first half of antenna port cyclic shift values or a value in a second half of antenna port cyclic shift values, and wherein different groups of the plurality of groups of SRS ports are configured with a same comb offset value based on the antenna port cyclic shift value of the first SRS port in the at least one group of SRS ports being the value in the first half of antenna port cyclic shift values, wherein different groups of the plurality of groups of SRS ports are configured with different comb offset values based on the antenna port cyclic shift value of the first SRS port in the at least one group of SRS ports being the value in the second half of antenna port cyclic shift values.

In Aspect 8, the method of Aspect 1-7 further includes determining that different groups of the plurality of groups of SRS ports are configured with different comb offset values based on at least one SRS port of each group of SRS ports of the plurality of groups of SRS ports being separately configured with a respective antenna port cyclic shift value.

In Aspect 9, the method of Aspects 1-7 further includes that the configuration further indicates one or more comb offset values assigned to the plurality of groups of SRS ports, wherein SRS ports of a same group of SRS ports of the plurality of groups of SRS ports are configured with a same comb offset value.

In Aspect 10, the method of Aspects 1-9 further includes that the configuration further indicates a different port number corresponding to each SRS port of each group of SRS ports of the plurality of groups of SRS ports, wherein each group of SRS ports of the plurality of groups of SRS ports is configured with a specified quantity of SRS ports based on an order of the port numbers corresponding to SRS ports of the group of SRS ports.

In Aspect 11, the method of Aspects 1-9 further includes that the configuration further indicates that each group of SRS ports of the plurality of groups of SRS ports includes SRS ports that are coherent to one another within the group.

In Aspect 12, the method of Aspects 1-9 further includes that the configuration further indicates that each group of SRS ports of the plurality of groups of SRS ports is grouped with respective SRS ports based on a symbol on which a respective SRS port is transmitted.

In Aspect 13, the method of Aspect 12 further includes that SRS ports transmitted on a same symbol belong to a same group of SRS ports of the plurality of groups of SRS ports.

In Aspect 14, the method of Aspect 12 further includes that SRS ports transmitted on different symbols belong to different respective groups of the plurality of groups of SRS ports.

Aspect 15 is a device including one or more processors and one or more memories in electronic communication with the one or more processors storing instructions executable by the one or more processors to cause a system or an apparatus to implement a method as in any of Aspects 1 to 14.

Aspect 16 is a system or apparatus including means for implementing a method or realizing an apparatus as in any of Aspects 1 to 14.

Aspect 17 is a non-transitory computer-readable medium storing instructions executable by one or more processors to cause the one or more processors to implement a method as in any of Aspects 1 to 14.

Aspect 18 is a method of wireless communication performed by a network entity that includes transmitting a configuration for a plurality of groups of sounding reference signal (SRS) ports associated with an SRS resource, the configuration indicating one or more cyclic shift parameters for each group of SRS ports of the plurality of groups of SRS ports. The method also includes receiving one or more SRSs of at least one group of SRS ports of the plurality of groups of SRS ports based at least in part on the one or more cyclic shift parameters of the at least one group of SRS ports.

In Aspect 19, the method of Aspect 18 further includes determining an antenna port cyclic shift value for each SRS port in the at least one group of SRS ports based on the one or more cyclic shift parameters corresponding to the at least one group of SRS ports.

In Aspect 20, the method of Aspects 18 or 19 further include that the one or more cyclic shift parameters indicate an antenna port cyclic shift value for a first SRS port in the at least one group of SRS ports, and wherein cyclic shift values for other SRS ports within the at least one group of SRS ports are uniformly distributed based on the antenna port cyclic shift value of the first SRS port.

In Aspect 21, the method of Aspect 20 further includes determining a value for a cyclic shift spacing across consecutive SRS ports in the at least one group of SRS ports, wherein the value for the cyclic shift spacing is common among the plurality of groups of SRS ports; and determining an antenna port cyclic shift value for each SRS port in the at least one group of SRS ports based on the value for the cyclic shift spacing being applied separately for each group of SRS ports of the plurality of SRS ports.

In Aspect 22, the method of Aspect 20 further includes determining a value for a cyclic shift spacing across consecutive SRS ports in the at least one group of SRS ports, wherein the value for the cyclic shift spacing is unique to the at least one group of SRS ports; and determining an antenna port cyclic shift value for each SRS port in a first group of SRS ports based on the value for the cyclic shift spacing being applied separately for each group of SRS ports of the plurality of groups of SRS ports.

In Aspect 23, the method of Aspects 18-22 further includes that the plurality of groups of SRS ports includes a total number of four or more SRS ports, the method also includes determining whether the antenna port cyclic shift value of a first SRS port in the SRS resource is a value in a first half of antenna port cyclic shift values or a value in a second half of antenna port cyclic shift values; configuring different groups of the plurality of groups of SRS ports with a same comb offset value based on the antenna port cyclic shift value of the first SRS port in the SRS resource being the value in the first half of antenna port cyclic shift values; and configuring different groups of the plurality of groups of SRS ports with different comb offset values based on the antenna port cyclic shift value of the first SRS port in the SRS resource being the value in the second half of antenna port cyclic shift values.

In Aspect 24, the method of Aspects 18-22 further includes that the plurality of groups of SRS ports includes a total number of four or more SRS ports, the method further includes determining whether the antenna port cyclic shift value of a first SRS port in the at least one group of SRS ports is a value in a first half of antenna port cyclic shift values or to a value in a second half of antenna port cyclic shift values; configuring different groups of the plurality of groups of SRS ports with a same comb offset value based on the antenna port cyclic shift value of the first SRS port in the at least one group of SRS ports being the value in the first half of antenna port cyclic shift values; and configuring different groups of the plurality of groups of SRS ports with different comb offset values based on the antenna port cyclic shift value of the first SRS port in the at least one group of SRS ports being the value in the second half of antenna port cyclic shift values.

In Aspect 25, the method of Aspects 18-22 further includes configuring at least one SRS port of each group of SRS ports of the plurality of groups of SRS ports separately with a respective antenna port cyclic shift value; and configuring different groups of the plurality of groups of SRS ports with different comb offset values based on the at least one SRS port of each group of SRS ports being separately configured with the respective antenna port cyclic shift value.

In Aspect 26, the method of Aspects 18-22 further includes that the configuration further indicates one or more comb offset values assigned to the plurality of groups of SRS ports, wherein SRS ports of a same group of SRS ports of the plurality of groups of SRS ports are configured with a same comb offset value.

In Aspect 27, the method of Aspects 18-26 further includes that the configuration further indicates a different port number corresponding to each SRS port of each group of SRS ports of the plurality of groups of SRS ports, and wherein the method further comprises configuring each group of SRS ports of the plurality of groups of SRS ports with a specified quantity of SRS ports based on an order of the port numbers corresponding to SRS ports of the group of SRS ports.

In Aspect 28, the method of Aspects 18-26 further includes that the configuration further indicates that each group of SRS ports of the plurality of groups of SRS ports includes SRS ports that are coherent to one another within the group.

In Aspect 29, the method of Aspects 18-26 further includes that the configuration further indicates that each group of SRS ports of the plurality of groups of SRS ports is grouped with respective SRS ports based on a symbol on which a respective SRS port is transmitted.

In Aspect 30, the method of Aspect 29 further includes that SRS ports transmitted on a same symbol belong to a same group of SRS ports of the plurality of groups of SRS ports.

In Aspect 31, the method of Aspect 29 further includes that SRS ports transmitted on different symbols belong to different respective groups of the plurality of groups of SRS ports.

Aspect 32 is a device including one or more processors and one or more memories in electronic communication with the one or more processors storing instructions executable by the one or more processors to cause a system or an apparatus to implement a method as in any of Aspects 18 to 31.

Aspect 33 is a system or apparatus including means for implementing a method or realizing an apparatus as in any of Aspects 18 to 31.

Aspect 34 is a non-transitory computer-readable medium storing instructions executable by one or more processors to cause the one or more processors to implement a method as in any of Aspects 18 to 31.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), the method comprising:
   receiving a configuration for a plurality of groups of sounding reference signal (SRS) ports associated with an SRS resource, the configuration indicating one or more cyclic shift parameters for each group of SRS ports of the plurality of groups of SRS ports; and
   transmitting one or more SRSs using at least one group of SRS ports of the plurality of groups of SRS ports based at least in part on the one or more cyclic shift parameters associated with the at least one group of SRS ports,
   wherein the one or more cyclic shift parameters indicate an antenna port cyclic shift value for a first SRS port in the at least one group of SRS ports, and wherein cyclic shift values for other SRS ports within the at least one group of SRS ports are uniformly distributed based on the antenna port cyclic shift value of the first SRS port, and
   wherein the plurality of groups of SRS ports includes a total number of four or more SRS ports, the method further comprising:
   determining whether the antenna port cyclic shift value of a first SRS port in the SRS resource is a value in a first half of antenna port cyclic shift values or a value in a second half of antenna port cyclic shift values, and
   wherein different groups of the plurality of groups of SRS ports are configured with a same comb offset value based on the antenna port cyclic shift value of the first SRS port in the SRS resource being the value in the first half of antenna port cyclic shift values,
   wherein different groups of the plurality of groups of SRS ports are configured with different comb offset values based on the antenna port cyclic shift value of the first SRS port in the SRS resource being the value in the second half of antenna port cyclic shift values.

2. The method of claim 1, further comprising determining an antenna port cyclic shift value for each SRS port in the at least one group of SRS ports based on the one or more cyclic shift parameters associated with the at least one group of SRS ports.

3. The method of claim 1, wherein the configuration indicates a value for a cyclic shift spacing across consecutive SRS ports in the at least one group of SRS ports, wherein the value for the cyclic shift spacing is common among the plurality of groups of SRS ports, and wherein the method further comprises determining an antenna port cyclic shift value for each SRS port in the at least one group of SRS ports based on the value for the cyclic shift spacing being applied separately for each group of SRS ports of the plurality of groups of SRS ports.

4. The method of claim 1, wherein the configuration indicates a value for a cyclic shift spacing across consecutive SRS ports in the at least one group of SRS ports, wherein the value for the cyclic shift spacing is unique to the at least one group of SRS ports, and wherein the method further comprises determining an antenna port cyclic shift value for each SRS port in the at least one group of SRS ports based on the value for the cyclic shift spacing being applied separately for each group of SRS ports of the plurality of groups of SRS ports.

5. The method of claim 1, wherein the plurality of groups of SRS ports includes a total number of four or more SRS ports, the method further comprising:
   determining whether the antenna port cyclic shift value of a first SRS port in the at least one group of SRS ports of the plurality of groups of SRS ports is a value in a first half of antenna port cyclic shift values or a value in a second half of antenna port cyclic shift values, and
   wherein different groups of the plurality of groups of SRS ports are configured with a same comb offset value based on the antenna port cyclic shift value of the first SRS port in the at least one group of SRS ports being the value in the first half of antenna port cyclic shift values,
   wherein different groups of the plurality of groups of SRS ports are configured with different comb offset values based on the antenna port cyclic shift value of the first SRS port in the at least one group of SRS ports being the value in the second half of antenna port cyclic shift values.

6. The method of claim 1, further comprising determining that different groups of the plurality of groups of SRS ports are configured with different comb offset values based on at least one SRS port of each group of SRS ports of the plurality of groups of SRS ports being separately configured with a respective antenna port cyclic shift value.

7. The method of claim 1, wherein the configuration further indicates one or more comb offset values assigned to the plurality of groups of SRS ports, wherein SRS ports of a same group of SRS ports of the plurality of groups of SRS ports are configured with a same comb offset value.

8. The method of claim 1, wherein the configuration further indicates a different port number corresponding to each SRS port of each group of SRS ports of the plurality of groups of SRS ports, wherein each group of SRS ports of the plurality of groups of SRS ports is configured with a specified quantity of SRS ports based on an order of the port numbers corresponding to SRS ports of the group of SRS ports.

9. The method of claim 1, wherein the configuration further indicates that each group of SRS ports of the plurality of groups of SRS ports includes SRS ports that are coherent to one another within the group.

10. The method of claim 1, wherein the configuration further indicates that each group of SRS ports of the plurality of groups of SRS ports is grouped with respective SRS ports based on a symbol on which a respective SRS port is transmitted.

11. The method of claim 10, wherein SRS ports transmitted on a same symbol belong to a same group of SRS ports of the plurality of groups of SRS ports.

12. The method of claim 10, wherein SRS ports transmitted on different symbols belong to different respective groups of the plurality of groups of SRS ports.

13. A method of wireless communication performed by a network entity, the method comprising:
transmitting a configuration for a plurality of groups of sounding reference signal (SRS) ports associated with an SRS resource, the configuration indicating one or more cyclic shift parameters for each group of SRS ports of the plurality of groups of SRS ports; and
receiving one or more SRSs of at least one group of SRS ports of the plurality of groups of SRS ports based at least in part on the one or more cyclic shift parameters associated with the at least one group of SRS ports,
wherein the one or more cyclic shift parameters indicate an antenna port cyclic shift value for a first SRS port in the at least one group of SRS ports, and wherein cyclic shift values for other SRS ports within the at least one group of SRS ports are uniformly distributed based on the antenna port cyclic shift value of the first SRS port,
wherein the plurality of groups of SRS ports includes a total number of four or more SRS ports, the method further comprising:
determining whether the antenna port cyclic shift value of a first SRS port in the SRS resource is a value in a first half of antenna port cyclic shift values or a value in a second half of antenna port cyclic shift values;
configuring different groups of the plurality of groups of SRS ports with a same comb offset value based on the antenna port cyclic shift value of the first SRS port in the SRS resource being the value in the first half of antenna port cyclic shift values; and
configuring different groups of the plurality of groups of SRS ports with different comb offset values based on the antenna port cyclic shift value of the first SRS port in the SRS resource being the value in the second half of antenna port cyclic shift values.

14. The method of claim 13, further comprising determining an antenna port cyclic shift value for each SRS port in the at least one group of SRS ports based on the one or more cyclic shift parameters associated with the at least one group of SRS ports.

15. The method of claim 13, further comprising:
determining a value for a cyclic shift spacing across consecutive SRS ports in the at least one group of SRS ports, wherein the value for the cyclic shift spacing is common among the plurality of groups of SRS ports; and
determining an antenna port cyclic shift value for each SRS port in the at least one group of SRS ports based on the value for the cyclic shift spacing being applied separately for each group of SRS ports of the plurality of SRS ports.

16. The method of claim 13, further comprising:
determining a value for a cyclic shift spacing across consecutive SRS ports in the at least one group of SRS ports, wherein the value for the cyclic shift spacing is unique to the at least one group of SRS ports; and
determining an antenna port cyclic shift value for each SRS port in a first group of SRS ports based on the value for the cyclic shift spacing being applied separately for each group of SRS ports of the plurality of groups of SRS ports.

17. The method of claim 13, wherein the plurality of groups of SRS ports includes a total number of four or more SRS ports, the method further comprising:
determining whether the antenna port cyclic shift value of a first SRS port in the at least one group of SRS ports is a value in a first half of antenna port cyclic shift values or to a value in a second half of antenna port cyclic shift values;
configuring different groups of the plurality of groups of SRS ports with a same comb offset value based on the antenna port cyclic shift value of the first SRS port in the at least one group of SRS ports being the value in the first half of antenna port cyclic shift values; and
configuring different groups of the plurality of groups of SRS ports with different comb offset values based on the antenna port cyclic shift value of the first SRS port in the at least one group of SRS ports being the value in the second half of antenna port cyclic shift values.

18. The method of claim 13, further comprising:
configuring at least one SRS port of each group of SRS ports of the plurality of groups of SRS ports separately with a respective antenna port cyclic shift value; and
configuring different groups of the plurality of groups of SRS ports with different comb offset values based on the at least one SRS port of each group of SRS ports being separately configured with the respective antenna port cyclic shift value.

19. The method of claim 13, wherein the configuration further indicates one or more comb offset values assigned to the plurality of groups of SRS ports, wherein SRS ports of a same group of SRS ports of the plurality of groups of SRS ports are configured with a same comb offset value.

20. The method of claim 13, wherein the configuration further indicates a different port number corresponding to each SRS port of each group of SRS ports of the plurality of groups of SRS ports, and wherein the method further comprises configuring each group of SRS ports of the plurality of groups of SRS ports with a specified quantity of SRS ports based on an order of the port numbers corresponding to SRS ports of the group of SRS ports.

21. The method of claim 13, wherein the configuration further indicates that each group of SRS ports of the plurality of groups of SRS ports includes SRS ports that are coherent to one another within the group.

22. The method of claim 13, wherein the configuration further indicates that each group of SRS ports of the plurality of groups of SRS ports is grouped with respective SRS ports based on a symbol on which a respective SRS port is transmitted.

23. The method of claim 22, wherein SRS ports transmitted on a same symbol belong to a same group of SRS ports of the plurality of groups of SRS ports.

24. The method of claim 22, wherein SRS ports transmitted on different symbols belong to different respective groups of the plurality of groups of SRS ports.

25. A user equipment (UE) for wireless communication, comprising:
a memory; and
one or more processors, coupled to the memory, configured to:
receive a configuration for a plurality of groups of sounding reference signal (SRS) ports associated with an SRS resource, the configuration indicating one or more cyclic shift parameters for each group of SRS ports of the plurality of groups of SRS ports; and
transmit one or more SRSs using at least one group of SRS ports of the plurality of groups of SRS ports based at least in part on the one or more cyclic shift parameters associated with the at least one group of SRS ports,
wherein the one or more cyclic shift parameters indicate an antenna port cyclic shift value for a first SRS port in the at least one group of SRS ports, and wherein cyclic shift values for other SRS ports within the at least one group of SRS ports are uniformly distributed based on the antenna port cyclic shift value of the first SRS port, and
wherein the plurality of groups of SRS ports includes a total number of four or more SRS ports, and wherein the one or more processors are further configured to:
determine whether the antenna port cyclic shift value of a first SRS port in the SRS resource is a value in a first half of antenna port cyclic shift values or a value in a second half of antenna port cyclic shift values, and
wherein different groups of the plurality of groups of SRS ports are configured with a same comb offset value based on the antenna port cyclic shift value of the first SRS port in the SRS resource being the value in the first half of antenna port cyclic shift values,
wherein different groups of the plurality of groups of SRS ports are configured with different comb offset values based on the antenna port cyclic shift value of the first SRS port in the SRS resource being the value in the second half of antenna port cyclic shift values.

26. A network entity for wireless communication, comprising:
a memory; and
one or more processors, coupled to the memory, configured to:
transmit a configuration for a plurality of groups of sounding reference signal (SRS) ports associated with an SRS resource, the configuration indicating one or more cyclic shift parameters for each group of SRS ports of the plurality of groups of SRS ports; and
receive one or more SRSs of at least one group of SRS ports of the plurality of groups of SRS ports based at least in part on the one or more cyclic shift parameters associated with the at least one group of SRS ports,
wherein the one or more cyclic shift parameters indicate an antenna port cyclic shift value for a first SRS port in the at least one group of SRS ports, and wherein cyclic shift values for other SRS ports within the at least one group of SRS ports are uniformly distributed based on the antenna port cyclic shift value of the first SRS port,
wherein the plurality of groups of SRS ports includes a total number of four or more SRS ports, and
wherein the one or more processors are further configured to:
determine whether the antenna port cyclic shift value of a first SRS port in the SRS resource is a value in a first half of antenna port cyclic shift values or a value in a second half of antenna port cyclic shift values;
configure different groups of the plurality of groups of SRS ports with a same comb offset value based on the antenna port cyclic shift value of the first SRS port in the SRS resource being the value in the first half of antenna port cyclic shift values; and
configure different groups of the plurality of groups of SRS ports with different comb offset values based on the antenna port cyclic shift value of the first SRS port in the SRS resource being the value in the second half of antenna port cyclic shift values.

* * * * *